United States Patent
Tokuchi et al.

(10) Patent No.: US 11,880,785 B2
(45) Date of Patent: Jan. 23, 2024

(54) INFORMATION PROCESSING APPARATUS AND NON-TRANSITORY COMPUTER READABLE MEDIUM STORING PROGRAM FOR RENTING BUSINESS PLACE FOR NON-BUSINESS PURPOSES

(71) Applicant: FUJIFILM Business Innovation Corp., Tokyo (JP)

(72) Inventors: Kengo Tokuchi, Kanagawa (JP); Yoshikazu Kawai, Kanagawa (JP); Nobuyuki Yamazoe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 244 days.

(21) Appl. No.: 17/153,883

(22) Filed: Jan. 21, 2021

(65) Prior Publication Data
US 2022/0036255 A1    Feb. 3, 2022

(30) Foreign Application Priority Data
Jul. 31, 2020    (JP) ................. 2020-130058

(51) Int. Cl.
*G06Q 10/02* (2012.01)
*G06Q 20/08* (2012.01)
*G06Q 30/0202* (2023.01)
*G06Q 30/0645* (2023.01)

(52) U.S. Cl.
CPC ......... *G06Q 10/02* (2013.01); *G06Q 20/0855* (2013.01); *G06Q 30/0202* (2013.01); *G06Q 30/0645* (2013.01)

(58) Field of Classification Search
CPC ............. G06Q 10/02; G06Q 30/0202; G06Q 30/0645; G06Q 20/0855; G06Q 50/30; G06Q 10/08; G06Q 50/12; G06Q 50/16
USPC ........................................... 705/5, 7.31, 307
See application file for complete search history.

(56) References Cited

U.S. PATENT DOCUMENTS

| | | | | |
|---|---|---|---|---|
| 2001/0037383 | A1* | 11/2001 | Sabal | H04L 12/1464 709/225 |
| 2004/0120487 | A1* | 6/2004 | Cockrell | G06Q 30/04 379/114.14 |
| 2004/0143527 | A1* | 7/2004 | Benkert | G06Q 20/04 705/39 |
| 2005/0283389 | A1* | 12/2005 | Widjaja | G06Q 50/14 705/5 |
| 2013/0304655 | A1* | 11/2013 | Johnston | G06Q 30/0645 705/7.29 |

(Continued)

FOREIGN PATENT DOCUMENTS

| | | |
|---|---|---|
| JP | S42-004854 | 2/1967 |
| JP | 2002026977 | 1/2002 |

(Continued)

OTHER PUBLICATIONS

Carter, Sue), 40m offices for Dublin's inner city: The Irish Times DAC, Oct. 31, 2001, p. 52. (Year: 2001).*

*Primary Examiner* — Resha Desai
*Assistant Examiner* — Michelle E Carey
(74) *Attorney, Agent, or Firm* — JCIPRNET

(57) ABSTRACT

An information processing apparatus includes a processor configured to execute a process of renting a place where a business is conducted as a place used for purposes other than the business, in a case where a specific condition is satisfied.

16 Claims, 27 Drawing Sheets

(56) References Cited

U.S. PATENT DOCUMENTS

| | | | | |
|---|---|---|---|---|
| 2015/0058051 A1* | 2/2015 | Movshovich | ........... | G06Q 30/08 705/5 |
| 2015/0379435 A1* | 12/2015 | Johnson | ................. | G06Q 10/02 705/5 |
| 2018/0197349 A1* | 7/2018 | Oesterling | .............. | G07C 5/006 701/29.4 |
| 2019/0206550 A1* | 7/2019 | Wong | ...................... | G16H 40/20 705/2 |
| 2019/0232180 A1* | 8/2019 | Fischmann | ........... | A63G 31/007 4/494 |
| 2019/0318549 A1* | 10/2019 | Zeira | ...................... | G07C 5/008 701/29.2 |

FOREIGN PATENT DOCUMENTS

| | | |
|---|---|---|
| JP | 2004536397 | 12/2004 |
| JP | 2005085122 | 3/2005 |
| JP | 2005327193 | 11/2005 |
| JP | 6356894 | 7/2018 |
| JP | 2019082915 | 5/2019 |
| WO | 03003661 | 1/2003 |

\* cited by examiner

FIG. 6

| USER ID | TYPE | NAME | E-MAIL ADDRESS | PASSWORD | PAYMENT METHOD | PERSONAL PAYMENT ACCOUNT |
|---|---|---|---|---|---|---|
| 0001 | INDIVIDUAL | A1 | AAA@AA.com | ***** | CREDIT CARD INFORMATION | XXXX |
| 0002 | COOPERATION | A1 COOPERATION α | AAA@AA.com | ***** | — | — |
| 0003 | INDIVIDUAL | A2 | BBB@BB.com | ***** | CREDIT CARD INFORMATION | YYYY |
| ... | ... | ... | ... | ... | ... | ... |

FIG. 7

| RESERVATION ID | BOOTH ID | USAGE DATE AND TIME | USER | USAGE INFORMATION |
|---|---|---|---|---|
| 1 | B1 | JANUARY 6, 10:00 TO 11:00 | A1(INDIVIDUAL) (ID:0001) | C1 |
| 2 | B2 | JANUARY 7, 10:00 TO 11:00 | A1(COOPERATION) (ID:0002) | C2 |
| ... | ... | ... | ... | ... |

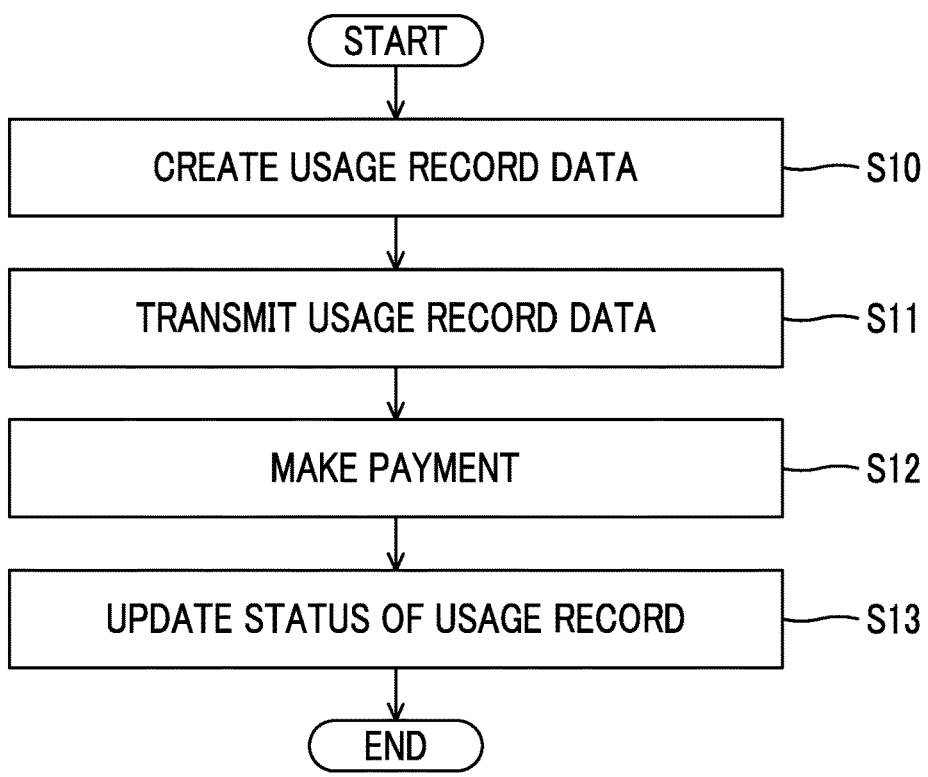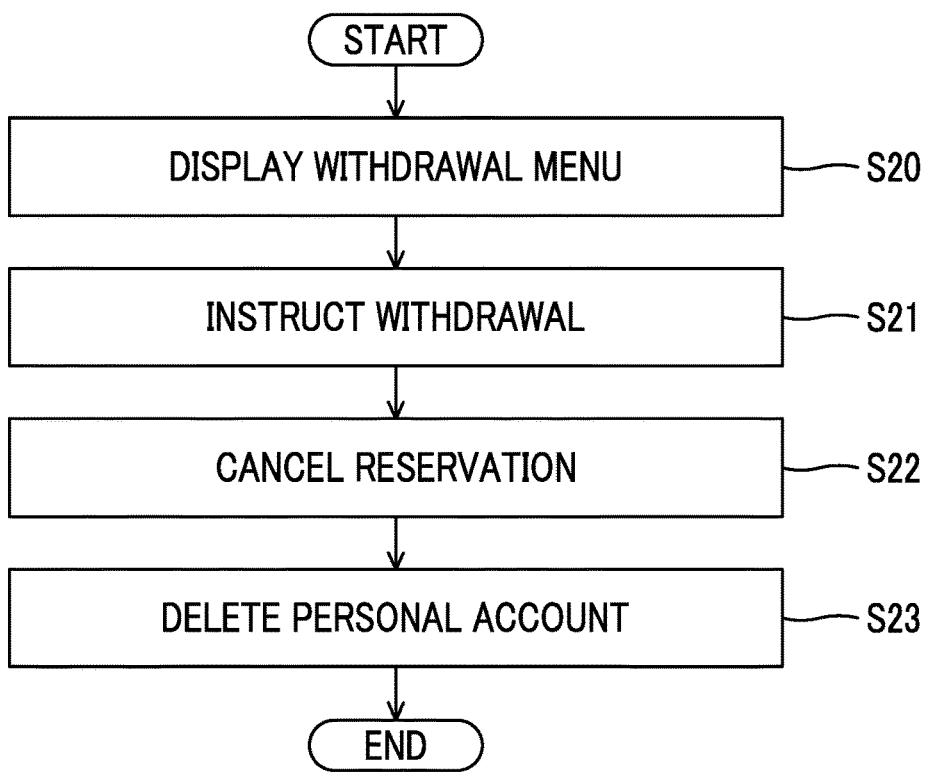

FIG. 10

START
↓
CREATE CONTRACT INFORMATION — S30
↓
REGISTER TARGET USER IN CORPORATE AUTHENTICATION SYSTEM — S31
↓
NOTIFY TARGET USER OF GUIDANCE OF USER REGISTRATION — S32
↓
REGISTER USER IN RESERVATION MANAGEMENT SYSTEM — S33
↓
END

FIG. 11

| CORPORATION ID | CORPORATION NAME | BELONGING USER | E-MAIL ADDRESS | AVAILABLE SERVICE | USAGE AUTHORITY |
|---|---|---|---|---|---|
| 1111 | α | A1 | AAA@AA.com | · BOOTH<br>· SERVICE XX | · PRESENCE<br>· PRESENCE |
| | | A2 | BBB@BB.com | · BOOTH<br>· SERVICE XX | · PRESENCE<br>· PRESENCE |
| ... | ... | ... | ... | ... | ... |

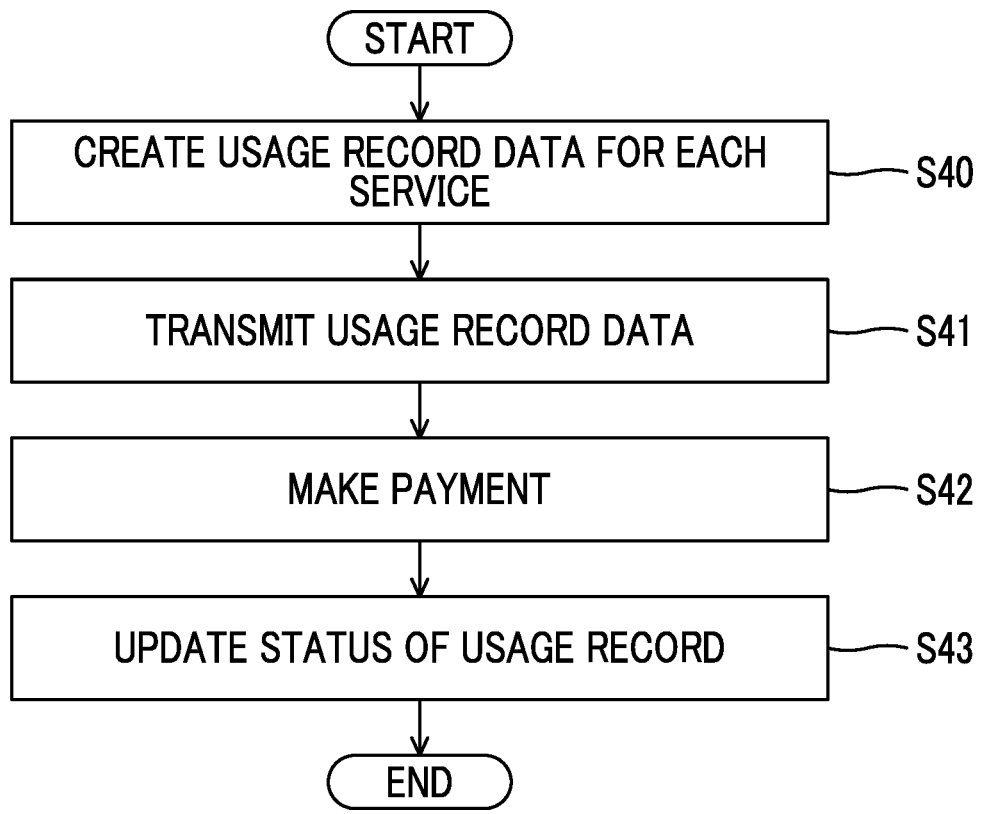
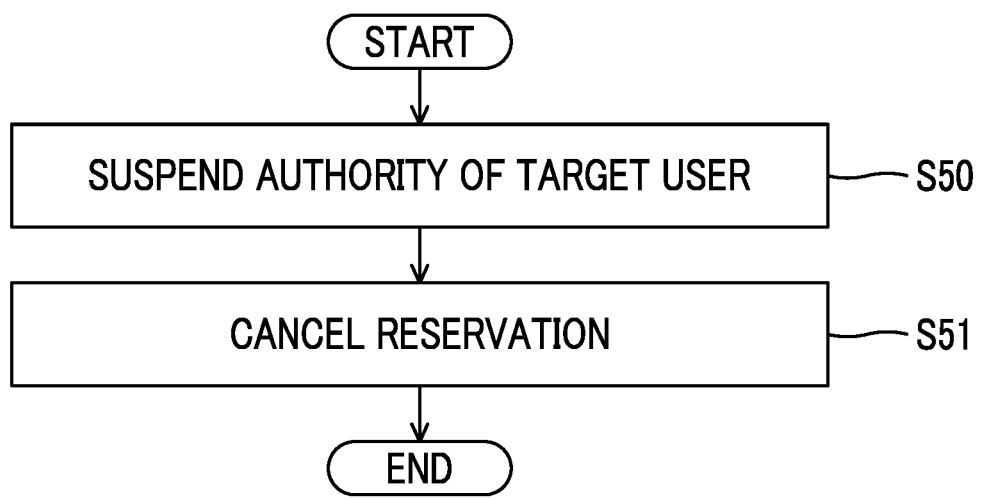

FIG. 23

PLACE α: USER A
10/8/2021

| RESERVATION TIME | RESERVATION AVAILABILITY |
|---|---|
| 9:00 TO 10:00 | ○ |
| 10:00 TO 11:00 | ○ |
| 11:00 TO 12:00 | × |
| . . . | . . . |
| 21:00 TO 22:00 | × |

FIG. 24

PLACE α: USER B
10/8/2021

| RESERVATION TIME | RESERVATION AVAILABILITY |
|---|---|
| 9:00 TO 10:00 | ○ |
| 10:00 TO 11:00 | × |
| 11:00 TO 12:00 | × |
| . . . | . . . |
| 21:00 TO 22:00 | ○ |

FIG. 26

| SEARCH FOR BOOTH |
|---|
| USE DATE |

68 — OCTOBER 13 (FRIDAY) | TODAY | TOMORROW

PLACE

SEARCH FROM CURRENT POSITION

PLACE   CLOSEST STATION

☐ AAA STATION    [i]

☐ BBB STATION    [i]

☐ CCC STATION    [i]

SEARCH WITH THESE CONDITIONS

| | SEARCH RESULT | | |
|---|---|---|---|
| OCTOBER 16 (MONDAY) 10:00 TO 11:00 AAA STATION ||||
| | A | B | C |
| 06:00 | ○ | ○ | ○ |
| 06:15 | ○ | ○ | ○ |
| 06:30 | ○ | ○ | ○ |
| 06:45 | ○ | ○ | ○ |
| 07:00 | × | ○ | ○ |
| 07:15 | × | ○ | ○ |
| 07:30 | × | ○ | ○ |
| 07:45 | × | ○ | ○ |
| 08:00 | ○ | × | ○ |
| 08:15 | ○ | × | ○ |
| 08:30 | ○ | × | ○ |
| CONFIRM WITH THESE CONTENTS ||||

RESERVATION COMPLETION

MAKE RESERVATION WITH FOLLOWING CONTENTS.

AAA STATION BOOTH A
OCTOBER 16, 2021
10:00 TO 10:45

WHEN YOU ARRIVE AT BOOTH, PLEASE USE IT AFTER UNLOCKING IT FROM "CONFIRM RESERVATION/ENTER ROOM" ON THE HOME SCREEN.

RETURN TO HOME SCREEN

INFORMATION PROCESSING APPARATUS AND NON-TRANSITORY COMPUTER READABLE MEDIUM STORING PROGRAM FOR RENTING BUSINESS PLACE FOR NON-BUSINESS PURPOSES

CROSS-REFERENCE TO RELATED APPLICATIONS

This application is based on and claims priority under 35 USC 119 from Japanese Patent Application No. 2020-130058 filed Jul. 31, 2020.

BACKGROUND

(i) Technical Field

The present invention relates to an information processing apparatus and a non-transitory computer readable medium storing program.

(ii) Related Art

JP2005-327193A describes a system in which a reservation user accesses a reservation reception site from a reservation user terminal, reserves reservation contents including usage start date and time and check-out date and time of a hotel, and hotel usage fee, on the reservation reception site, and makes a credit payment for the hotel usage fee on the reservation reception site via a credit card payment center.

JP2019-082915A describes a reservation system in which from a plurality of reservation routes including a reception terminal installed in a facility, accepts reservations by users, records reservation information associated with the reservation route, performs a display process of a list of users who have made reservations based on the reservation information in order to display a management screen on the facility terminal for managing the reservation information, and transmits a display processing result in response to a display request from the facility terminal. The management screen displays a list of reservations. The display process includes a process of assigning a background color different from at least a part of reservations from other reservation routes, regarding reservations made through the reception terminal route in the list, to make the reservation route identifiable.

JP2004-536397A describes a system for reserving services available on residential computer networks, in which information about the calendar and reservation reception schedule stored in a central host server is integrated to optimize usability of organizing tools, and prevent duplicate reservations for shared facilities, and displayed on the display unit of a communication terminal in the adjusted state.

JP2002-026977A describes a bandwidth distribution service method with which a priority reservation type service that declares a service start time, a service end time, and a communication band in advance, and an ordinary reservation type service that declares the amount of communication data are provided, in the priority reservation type service, a bandwidth is secured for a period from a time when the reservation is declared to a time when the reservation ends, and in the ordinary reservation type service, an unused period within the bandwidth period secured by the reservation of the priority reservation type service is allocated to the service.

SUMMARY

Aspects of non-limiting embodiments of the present disclosure relate to an information processing apparatus and a non-transitory computer readable medium storing program which ensure that a place where a business is conducted is to be used for purposes other than the business.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to execute a process of renting a place where a business is conducted as a place used for purposes other than the business, in a case where a specific condition is satisfied.

BRIEF DESCRIPTION OF THE DRAWINGS

Exemplary embodiment(s) of the present invention will be described in detail based on the following figures, wherein:

FIG. 6 is a diagram illustrating an individual user management table;

FIG. 7 is a diagram illustrating a reservation management table;

FIG. 8 is a diagram illustrating a flowchart illustrating a payment flow for a user having a personal account;

FIG. 9 is a diagram illustrating a flowchart illustrating a process of withdrawing an individual user from the reservation management system;

FIG. 10 is a diagram illustrating a flowchart illustrating a process of registering a corporate user in a reservation management system;

FIG. 11 is a diagram illustrating a corporate user management table;

FIG. 12 is a diagram illustrating a flowchart illustrating a flow of payment for a corporate;

FIG. 13 is a diagram illustrating a flowchart illustrating a process of withdrawing a corporate user from the operation management system;

FIG. 23 is a diagram illustrating a reservation screen;

FIG. 24 is a diagram illustrating a reservation screen;

FIG. 26 is a diagram illustrating a search screen;

FIG. 27 is a diagram illustrating a screen of search results;

FIG. 28 is a diagram illustrating a reservation completion screen;

FIG. 32 is a diagram illustrating a candidate date for reservation, and the like;

DETAILED DESCRIPTION

Figure 1:
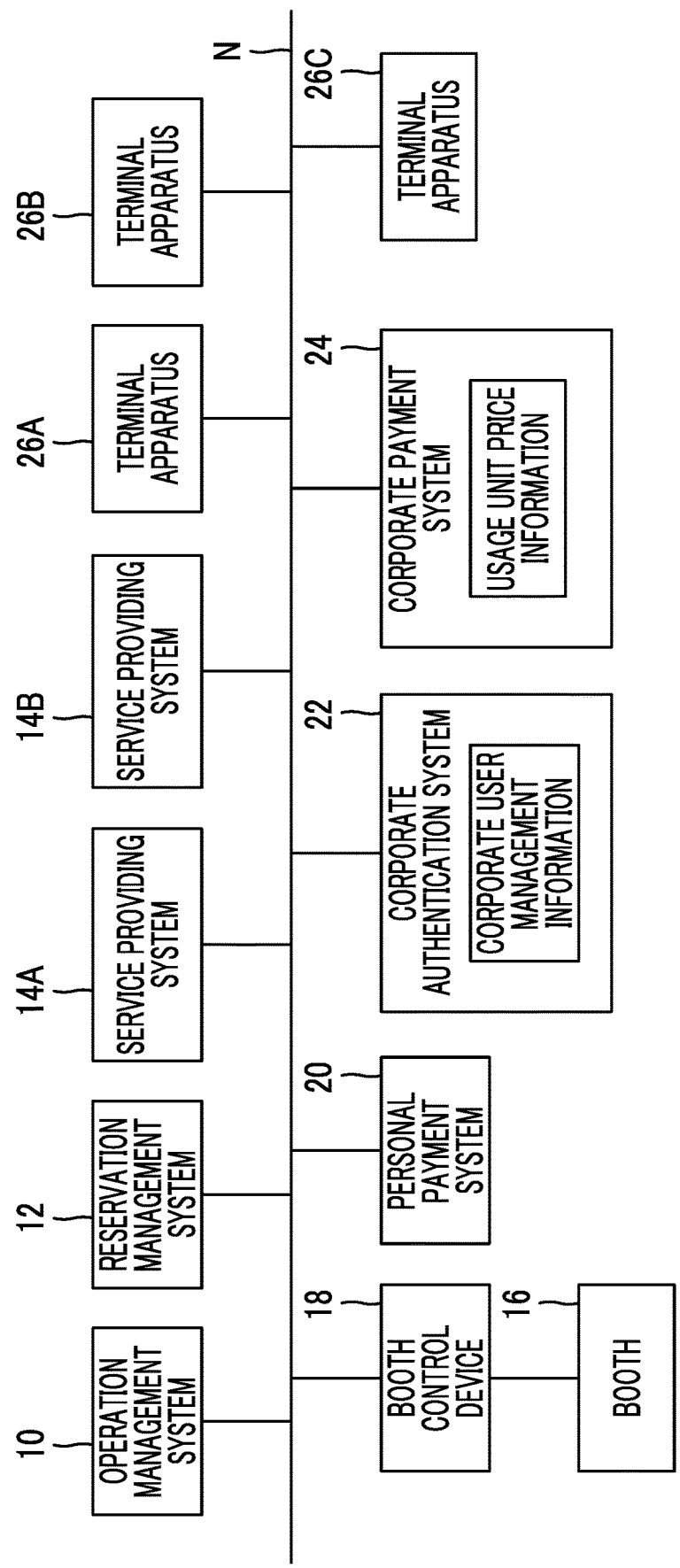
FIG. 1 is a block diagram illustrating a configuration of an information processing system according to the present exemplary embodiment.

An information processing system according to the present exemplary embodiment will be described with reference to FIG. 1. FIG. 1 illustrates an example of the configuration of the information processing system according to the present exemplary embodiment.

The information processing system according to the present exemplary embodiment includes an operation management system 10, a reservation management system 12 which is an example of a service providing system, service providing systems other than the reservation management system 12 (for example, service providing systems 14A and 14B), a booth control device 18 that controls a booth 16 which is an example of a place, a personal payment system 20, a corporate authentication system 22, a corporate payment system 24, and terminal apparatuses (for example, terminal apparatuses 26A, 26B, and 26C). The number of systems and apparatuses illustrated in FIG. 1 is only an example.

Each system and each apparatus included in the information processing system has a function of communicating with other systems and other apparatuses. The communication may be wired communication using a cable, or wireless communication. That is, each system and each apparatus may transmit and receive information to and from each other by being physically connected to other systems and other apparatuses by a cable, or may transmit and receive information to and from each other by wireless communication. For example, near field communication, Wi-Fi (registered trademark), or the like is used as the wireless communication. Wireless communication of standards other than these may be used.

Near field communication is, for example, Bluetooth (registered trademark), radio frequency identifier (RFID), NFC, or the like. For example, each system and each apparatus may communicate with other systems and apparatuses through a communication path N such as a local area network (LAN) or the Internet.

In the information processing system according to the present exemplary embodiment, services are provided to the user by the service providing system. The services provided by the service providing system include, for example, a service that provides a place to a user, a service that provides a printer, a service that provides a virtual desktop infrastructure (VDI), a service that provides a TV conference, a Web service, or other services. The place may be a closed space or an open space. For example, the place may be a booth 16, a conference room, a shared room, an office such as a shared office, a classroom, a store, a plaza, or separated spaces other than these. The place of which locking is managed by an electronic lock or the like and may be rented to the user. The Web service is, for example, a service for providing an application on a network such as the Internet, or other services. For example, web learning (for example, learning of English conversation), web-based training (WBT), web mails, social network services (SNS), services that provide video and music on the Internet, services for selling products and making reservations on the Internet, search services on the Internet, services that provide information on the Internet, or the like correspond to an example of a Web service. Of course, services other than these may be provided by the service providing system.

For example, in a case where a user's account is created and the user is registered in the information processing system, the user can use a service that is permitted to be used by the user.

The user's account is, for example, a personal account that is an account for an individual user to use the service, or an organizational account for a user belonging to an organization (for example, a corporation such as a company or another organization) to use the service. In the following, as an example, it is assumed that the organization is a corporate (for example, a commercial corporate or a non-profit corporate), and the organization account is a corporate account.

In the following, a user who uses a service by using a personal account will be referred to as an "individual user", and a user who uses a service by using a corporate account is referred to as a "corporate user".

In the following, as an example, a personal account and a corporate account are distinguished and an individual user and a corporate user are distinguished, but a personal account and a corporate account may not be distinguished and an individual user and a corporate user may not be distinguished.

By using a personal account, an individual user can use services that are permitted to be used using the personal account. For example, an individual user is registered for each service and can use the service in which the user is registered. By using a corporate account, a corporate user can use services that are permitted to be used using the corporate account. In a case where a contract to use one or more services is concluded between a corporation and an operating company that provides the operation management system 10, the corporate user belonging to the corporation can use one or more services permitted by the contract, by using the corporate account to use the contract.

The user may have both a personal account and a corporate account. For example, in a case where a user is registered as an individual user, a personal account is assigned to the user. In addition, in a case where the user belongs to a corporation, a corporate account may be issued and assigned to the user. In this case, the user may have both a personal account and a corporate account. The user may use the service by using a personal account or may use the service by using a corporate account.

The service provided by the service providing system is basically a paid service, and in a case where the service is used by the user, the payment system makes a payment for the use of the service. That is, in a case where a service is used, a usage fee for the service is charged, and a billing process (for example, payment process) is performed by the payment system. Of course, a free service may be provided.

The operation management system 10 is configured to manage the operation of the information processing system according to the present exemplary embodiment. For example, the operation management system 10 supports the provision of services by the reservation management system 12 and the service providing systems 14A and 14B, or controls the process related to payment. For example, the operation management system 10 is operated by an operating company or the like that provides the information processing system according to the present exemplary embodiment.

The reservation management system 12 is configured to manage reservations for the booth 16. For example, in a case where the booth 16 is reserved by a user, the user who has made the reservation is permitted to use the reserved booth 16. For example, in a case where the usage time, which is the time when the booth 16 can be used, is designated by the user and the booth 16 is reserved, the user is permitted to use the reserved booth 16 during the usage time. The usage time is determined by, for example, a date and a time zone. The reservation management system 12 may manage reservations for spaces and places other than the booth 16. That is, the reservation management system 12 manages the reservation of the place to be rented.

The service providing systems 14A and 14B are configured to provide services other than the services provided by the reservation management system 12. The service providing systems 14A and 14B may provide different services or may provide the same service. In the example illustrated in FIG. 1, service providing systems 14A and 14B as service providing systems other than the reservation management system 12 are included in the information processing system, but one or more service providing systems as systems other than the reservation management system 12 may be included in the information processing system, or service providing systems other than the reservation management system 12 may not be included in the information processing system.

The booth 16 is an example of a space or place rented to a user. For example, a partitioned space, private room, seat, section, or the like is an example of the booth 16. In addition, the booth 16 is locked and rented to the user. For example, the booth 16 has a door that can be locked by an electronic lock. The reservation for rental of the booth 16 is managed by the reservation management system 12. Although one booth 16 is illustrated in FIG. 1, a plurality of booths 16 may be installed, and reservations for the plurality of booths 16 may be managed by the reservation management system 12.

Lighting, a power source, an air conditioner, and other devices (for example, a printer, a scanner, a copier, a multifunction device (for example, a device having a printing function and a scanning function), or the like) may be provided in the booth 16.

Various sensors may be provided in the booth 16. For example, the booth 16 may be provided with a human sensor which is a sensor for detecting the presence or absence of a person in the booth 16, a temperature sensor which is a sensor for detecting the temperature in the booth 16, a humidity sensor which is a sensor for detecting the humidity in the booth 16, an odor sensor which is a sensor for detecting the odor in the booth 16, a pressure sensor which is a sensor for detecting the pressure in the booth 16, a camera for photographing the inside of the booth 16, a microphone for collecting sounds in the booth 16, and the like.

The booth control device 18 controls the electronic lock provided in the booth 16 or controls each device installed in the booth 16. For example, the booth control device 18 includes a communication device, a user interface (hereinafter referred to as "UI"), a memory, and a processor. For example, the control of the electronic lock and the control of each device in the booth 16 are performed by the processor of the booth control device 18. The booth control device 18 may control one booth 16 or may control a plurality of booths 16. Further, a plurality of booth control devices 18 may be included in the information processing system, and each booth control device 18 may control one or a plurality of booths 16.

The personal payment system 20 is configured to make a payment for the user as an individual in a case where the service is used by the user as an individual by using the personal account. That is, the personal payment system 20 performs a billing process of the usage fee for the individual user. As the personal payment system 20, a known payment system may be used. For example, a personal payment account, which is an account for making a payment for an individual user, is created, and the personal account of the individual user and the personal payment account are linked and managed. In a case where the service is used by using a personal account, the personal payment system 20 makes a payment using the personal payment account linked to the personal account. For example, the information on the user's credit card is registered in the personal payment system 20, and the personal payment system 20 makes a payment by using the credit card. Payment may be made using a payment method other than a credit card.

The corporate authentication system 22 is configured to authenticate a user belonging to a corporation, which is an example of an organization. As the authentication, for example, Sender Policy Framework (SPF) authentication is used. For example, the corporate authentication system 22 stores corporate user management information. For example, for each corporation, corporate identification information (for example, corporate ID) that is information for identifying a corporation and user information that is information about a user belonging to the corporation (for example, information including user identification information that is information for identifying a user) are associated with each other, and these types of information are registered in the corporate user management information and managed.

The corporate payment system 24 is configured to make a payment for the corporate in a case where the service is used by the user using the corporate account. That is, the corporate payment system 24 performs a billing process of the usage fee for the corporation. For the corporate payment system 24, a known payment system may be used. For example, usage unit price information indicating the unit price for using the service is created, and the usage unit price information is stored in the corporate payment system 24. The unit price of use may be set for each corporation. For example, the unit price of use is determined by a contract or the like. The corporate payment system 24 makes payments for a corporation by using the usage unit price information. The corporate payment system 24 corresponds to an example of the second payment system.

The terminal apparatuses 26A, 26B, and 26C are, for example, a personal computer (hereinafter referred to as "PC"), a tablet PC, a smartphone, a mobile phone, or the like.

For example, the terminal apparatus 26A is used by an individual user, the terminal apparatus 26B is used by a user belonging to a corporation, and the terminal apparatus 26C is used by a person who manages a user belonging to a corporation. In the following, in a case where it is not necessary to distinguish the terminal apparatuses 26A, 26B, and 26C, the terminal apparatuses 26A, 26B, and 26C will be referred to as "terminal apparatus 26". The information processing system may include a terminal apparatus used by a person who manages the operation management system 10.

In the information processing system according to the present exemplary embodiment, the data on the usage record of the service used by the user is transmitted to a payment system different depending on the type of the user's account, and the payment is made by the payment system. The usage record is, for example, the type of service, the length of service usage time, the usage time zone, the number of usages, and the like. The payment system makes payments based on the usage record. For example, the data on the usage record is transmitted to the payment system and the payment is made at each predetermined period (for example, every month).

Specifically, in a case where a user uses a service by using a personal account, data on the usage record of the service used by the user is transmitted to the personal payment system 20, and the personal payment system 20 makes a payment for the user.

In a case where a user belonging to a certain corporation uses a service by using a corporate account, data on the usage record of the service used by each user belonging to the corporate is transmitted to the corporate payment system 24, and payment is made for the corporation by the corporate payment system 24. In the corporate payment system 24, payment is not performed for individual users belonging to a corporation.

Figure 2:
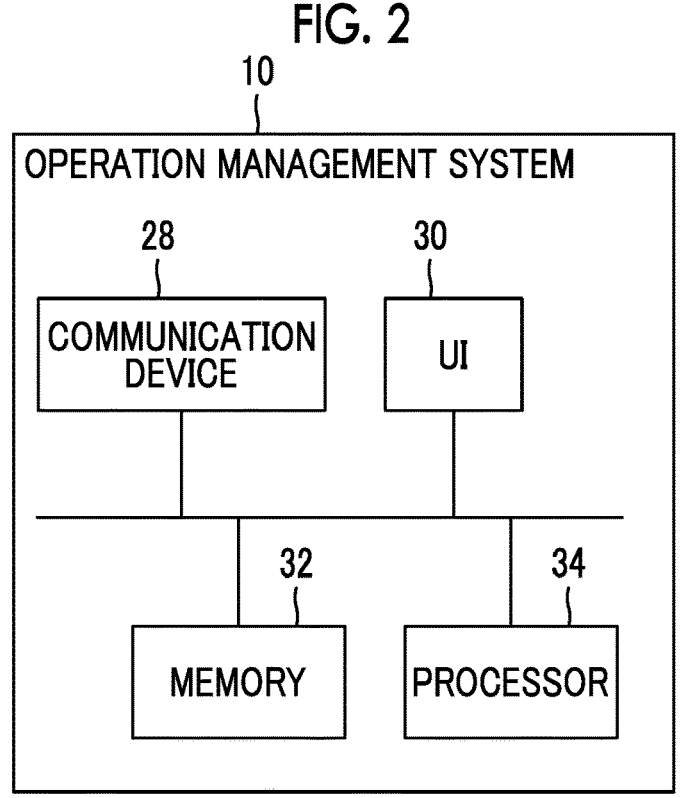
FIG. 2 is a block diagram illustrating a configuration of an operation management system.

Hereinafter, the configuration of the operation management system 10 will be described in detail with reference to FIG. 2. FIG. 2 illustrates an example of the configuration of the operation management system 10.

The operation management system 10 includes, for example, a communication device 28, a UI 30, a memory 32, and a processor 34. The operation management system 10 may include configurations other than these.

The communication device 28 is a communication interface having a communication chip, a communication circuit, or the like, and has a function of transmitting information to other apparatuses and a function of receiving information transmitted from other apparatuses. The communication device 28 may have a wireless communication function or may have a wired communication function. The communication device 28 may communicate with other devices by using, for example, near field communication, or may communicate with other devices through a communication path such as a LAN or the Internet.

The UI 30 is a user interface and includes at least one of a display and an operation device. The display is a liquid crystal display, an EL display, or the like. The operation device is a keyboard, input keys, an operation panel, or the like. The UI 30 may be a UI such as a touch panel that has both a display and an operation device. The UI 30 may not be included in the operation management system 10.

The memory 32 is a device that constitutes one or a plurality of storage areas for storing data. The memory 32 is, for example, a hard disk drive, various types of memory (for example, a RAM, a DRAM, a ROM, or the like), other storage devices (for example, optical disk, or the like), or a combination thereof. One or a plurality of memories 32 are included in the operation management system 10.

The processor 34 is configured to control the operation of each unit of the operation management system 10. The processor 34 may have a memory.

Figure 3:
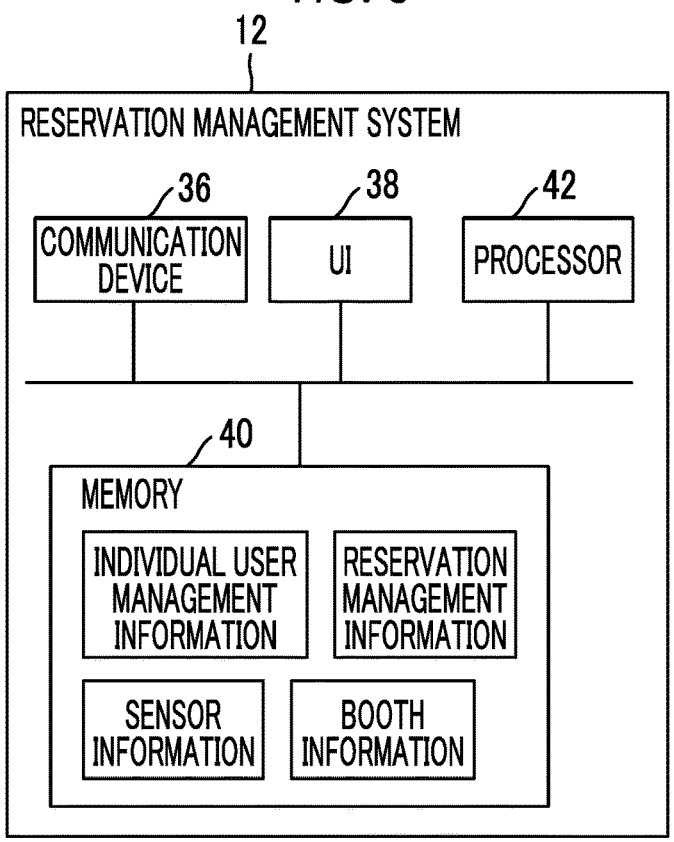
FIG. 3 is a block diagram illustrating a configuration of a reservation management system.

Hereinafter, the configuration of the reservation management system 12 will be described in detail with reference to FIG. 3. FIG. 3 illustrates an example of the configuration of the reservation management system 12.

The reservation management system 12 includes, for example, a communication device 36, a UI 38, a memory 40, and a processor 42. The reservation management system 12 may include configurations other than these.

The communication device 36 is a communication interface having a communication chip, a communication circuit, or the like, and has a function of transmitting information to other apparatuses and a function of receiving information transmitted from other apparatuses. The communication device 36 may have a wireless communication function or may have a wired communication function. The communication device 36 may communicate with other devices by using, for example, near field communication, or may communicate with other devices through a communication path such as a LAN or the Internet.

The UI 38 is a user interface and includes at least one of a display and an operation device. The display is a liquid crystal display, an EL display, or the like. The operation device is a keyboard, input keys, an operation panel, or the like. The UI 38 may be a UI such as a touch panel that has both a display and an operation device. The UI 38 may not be included in the reservation management system 12.

The memory 40 is a device that constitutes one or a plurality of storage areas for storing data. The memory 40 is, for example, a hard disk drive, various types of memory (for example, a RAM, a DRAM, a ROM, or the like), other storage devices (for example, optical disk, or the like), or a combination thereof. One or a plurality of memories 40 are included in the operation management system 10.

For example, individual user management information, reservation management information, sensor information, and booth information are stored in the memory 40.

The individual user management information is information for managing the users registered in the reservation management system 12. For example, the account of the user registered in the reservation management system 12 is registered in the individual user management information. Specifically, user information and the like related to the user registered in the reservation management system 12 are registered in the individual user management information. The user registered in the reservation management system 12 can use the service provided by the reservation management system 12. That is, the user registered in the reservation management system 12 can reserve the booth 16 by the reservation management system 12.

The reservation management information is information for managing the reservation of each booth 16. For example, booth identification information which is information for identifying the booth 16, usage time information which is information indicating the usage time (for example, reservation date and time) of the booth 16, user information about the user who has reserved the booth 16, usage information that is necessary information to use the booth 16 during usage time, or the like are registered in the reservation management information.

The sensor information is each type of information obtained by each sensor provided in the booth 16. Further, in a case where an abnormality is detected by the sensor, the sensor information may include information indicating that the abnormality has been detected. For example, the sensor information of each booth 16 is stored in the memory 40.

The booth information is information indicating the usage status of the booth 16. For example, for each booth 16, whether or not the booth 16 is in use is managed, and the information is included in the booth information. In a case where a space or place other than the booth 16 is rented, information about the place to be rented is stored in the memory 40.

At least one of the individual user management information, the reservation management information, the sensor information, and the booth information may be stored in the memory 32 of the operation management system 10. In this case, the information stored in the operation management system 10 may not be stored in the reservation management system 12.

The processor 42 is configured to control the operation of each unit of the reservation management system 12. The processor 42 may have a memory.

For example, the processor 42 is configured to manage reservations for places such as the booth 16. For example, the processor 42 receives a request for reservation of a place such as the booth 16 from the terminal apparatus 26, and registers the reservation of the place in the reservation management information. The processor 42 permits the user who has reserved the place to use the place. In a case where the usage time is reserved, the processor 42 permits the usage during the usage time.

Further, the processor 42 is configured to transmit data on the usage record of the service which is provided by the reservation management system 12 and is used by the user (for example, data on the usage record of the booth 16), to a payment system different depending on the type of the account of the user. For example, in a case where the service provided by the reservation management system 12 (for example, booth 16) is used by using the personal account, the processor 42 transmits the data on the usage record to the personal payment system 20, and in a case where the service provided by the reservation management system 12 (for example, booth 16) is used by using the corporate account, the processor 42 transmits the data on the usage record to the corporate payment system 24. Thus, in a case where the service is used by using the personal account, the payment is made by the personal payment system 20, and in a case where the service is used by using the corporate account, the payment is made by the corporate payment system 24.

Further, the processor 42 may be configured to create an account, register the user, authenticate the user, and the like, for using the service provided by the reservation management system 12.

The process executed by the processor 42 of the reservation management system 12 may be executed by the processor 34 of the operation management system 10. For example, in a case where the service is used by using a corporate account, the processor 34 of the operation management system 10 may transmit the usage record data to the corporate payment system 24. Similarly, other processes may be executed by the processor 34 of the operation management system 10.

The service providing systems 14A and 14B each include a communication device, a UI, a memory, and a processor, similarly to the reservation management system 12.

In the memory of the service providing system 14A, individual user management information which is information for managing the user registered in the service providing system 14A is stored. For example, the account of the user registered in the service providing system 14A is registered in the individual user management information. The user registered in the service providing system 14A can use the service provided by the service providing system 14A. The same applies to the service providing system 14B.

In a case where the service provided by the service providing system 14A is a service that can be reserved, the memory of the service providing system 14A stores reservation management information for managing the reservation of the service provided by the service providing system 14A.

Further, the processor of the service providing system 14A is configured to transmit the data on the usage record of the service provided by the service providing system 14A and used by the user to a payment system different depending on the type of the user's account. For example, in a case where the service provided by the service providing system 14A is used by using the personal account, the processor 42 of the service providing system 14A transmits the data on the usage record to the personal payment system 20, and in a case where the service provided by the service providing system 14A is used by using the corporate account, the processor 42 transmits the data on the usage record to the corporate payment system 24. Thus, in a case where the service is used by using the personal account, the payment is made by the personal payment system 20, and in a case where the service is used by using the corporate account, the payment is made by the corporate payment system 24. The same applies to the service providing system 14B.

Further, the processor of the service providing system 14A may be configured to create an account for using the service provided by the service providing system 14A, register the user, authenticate the user, and the like. The same applies to the service providing system 14B.

The process executed by the processors of the service providing systems 14A and 14B may be executed by the processor 34 of the operation management system 10.

Figure 4:
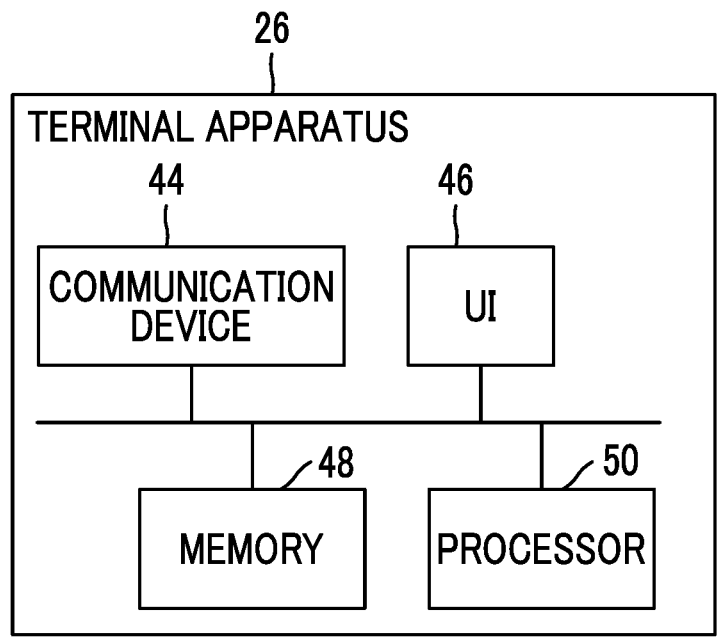
FIG. 4 is a block diagram illustrating a configuration of a terminal apparatus.

Hereinafter, the configuration of the terminal apparatus 26 will be described with reference to FIG. 4. FIG. 4 illustrates an example of the configuration of the terminal apparatus 26.

The terminal apparatus 26 includes, for example, a communication device 44, a UI 46, a memory 48, and a processor 50.

The communication device 44 is a communication interface having a communication chip, a communication circuit, or the like, and has a function of transmitting information to other apparatuses and a function of receiving information transmitted from other apparatuses. The communication device 44 may have a wireless communication function or may have a wired communication function. The communication device 44 may communicate with other devices by using, for example, near field communication, or may communicate with other devices through a communication path such as a LAN or the Internet.

The UI 46 is a user interface and includes at least one of a display and an operation device. The display is a liquid crystal display, an EL display, or the like. The operation device is a keyboard, input keys, an operation panel, or the like. The UI 46 may be a UI such as a touch panel that has both a display and an operation device. Further, the UI 46 may include a microphone and a speaker.

The memory 48 is a device that constitutes one or a plurality of storage areas for storing data. The memory 48 is, for example, a hard disk drive, various types of memory (for example, a RAM, a DRAM, a ROM, or the like), other storage devices (for example, optical disk, or the like), or a combination thereof. One or a plurality of memories 48 are included in the terminal apparatus 26.

The processor 50 is configured to control the operation of each unit of the terminal apparatus 26. The processor 50 may have a memory.

The case where the service provided by the reservation management system 12 is used by the user will be described below. That is, a case where a place such as the booth 16 is reserved, the reservation is managed by the reservation management system 12, and the reserved place is used will be described. In the following, a case where the booth 16 is reserved as an example of the place will be described.

In the information processing system according to the present exemplary embodiment, an account for using a service (for example, booth 16) is created by a process different depending on the type of user.

For example, in a case where a payment method by an individual user is registered in the personal payment system 20, the processor 42 of the reservation management system 12 creates a personal account for the individual user to use the booth 16. Further, in a case where a user belonging to a corporation is notified of the guidance of user registration and the information on the user who has received the notification is registered, the processor 42 creates a corporate account for the user who has received the notification to use the booth 16. These processes may be executed by the processor 34 of the operation management system 10. Hereinafter, these processes will be described in detail.

Figure 5:
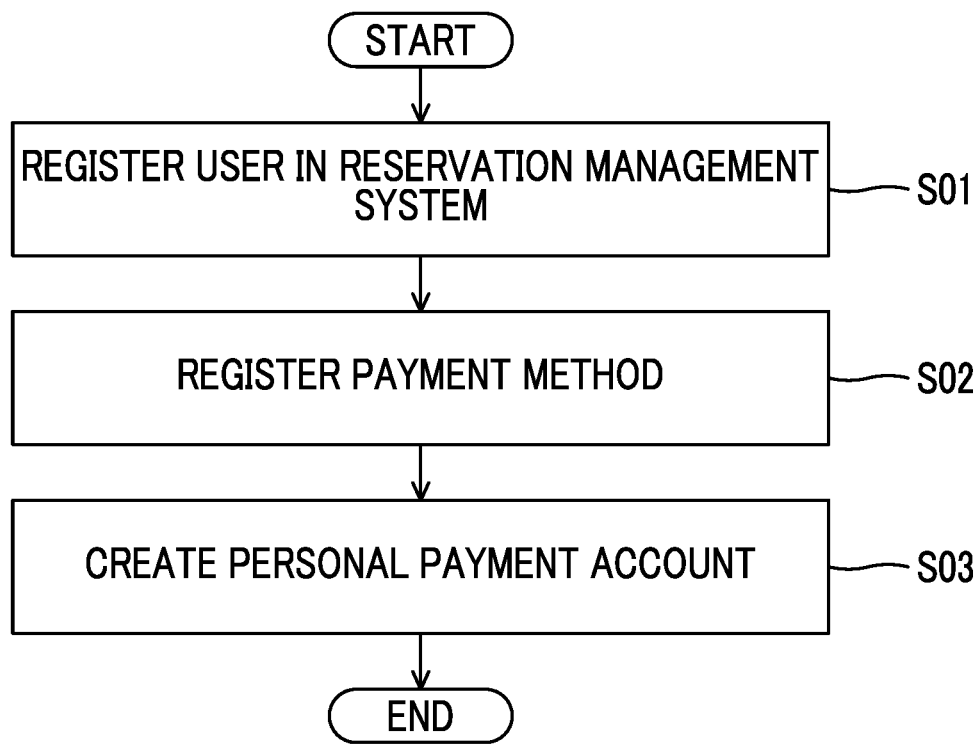
FIG. 5 is a diagram illustrating a flowchart illustrating a process of registering an individual user in a reservation management system.

A process of registering an individual user in the reservation management system 12 will be described with reference to FIG. 5. FIG. 5 illustrates a flowchart indicating the process. The scene where the individual user is registered in the reservation management system 12 corresponds to an example of the scene where the individual user concludes a contract to use the service provided by the reservation management system 12.

First, the processor 42 of the reservation management system 12 receives a request for registration of the individual user, and registers the individual user in the reservation management system 12 (S01). For example, in a case where the user uses the terminal apparatus 26A to access the reservation management system 12 and requests the reservation management system 12 for registration of an individual user, a screen for registering the user as an individual user in the reservation management system 12 is displayed on the display of the terminal apparatus 26A. In a case where the user inputs information such as the user's own name, e-mail address, and password on the screen by using the terminal apparatus 26A, these pieces of information are transmitted from the terminal apparatus 26A to the reservation management system 12. The processor 42 of the reservation management system 12 registers these pieces of information in the individual user management information, creates a personal account, and issues the personal account to the user. For example, the processor 42 creates a user ID associated with the personal account, registers the user ID in the individual user management information, and transmits the user ID to the terminal apparatus 26A. Thus, the user is notified of the user ID. The user ID may be determined by the user, input to the reservation management system 12, and registered in the individual user management information. The user ID and password associated with the personal account are used for the user to log in to the reservation management system 12 using the personal account.

At the stage where the payment method is not registered, the user can log in to the reservation management system 12 using the personal account, but may not be able to reserve the booth 16. That is, at the stage where the payment method is not registered, the processor 42 of the reservation management system 12 may not permit the user to reserve the booth 16. Of course, the processor 42 may permit the user to reserve the booth 16, even at a stage where the payment method is not registered.

Next, the processor 42 of the reservation management system. 12 registers the payment method for the use of the booth 16 in the reservation management system 12 and the personal payment system 20 (S02). For example, in a case where a user is registered in the reservation management system 12 and a personal account is created, a screen for registering a payment method and a menu for displaying the screen are displayed on the display of the terminal apparatus 26A. The user inputs information about the payment method on the screen by using the terminal apparatus 26A. For example, in a case where a credit card is used as a payment method, the user inputs information about the credit card (for example, the name, number, expiration date, security code, or the like of the owner of the credit card). Information about credit cards corresponds to an example of information about payment methods. Information about the credit card is transmitted from the terminal apparatus 26A to the reservation management system 12. The processor 42 of the reservation management system 12 registers the information about the credit card in the individual user management information in association with the personal account. Further, the information about the credit card is transmitted to the personal payment system 20 and registered in the personal payment system 20.

In a case where the information about the credit card is registered in the personal payment system 20, the personal payment system 20 creates a personal payment account (S03).

Information about the personal payment account is transmitted from the personal payment system 20 to the reservation management system 12. The processor 42 of the reservation management system 12 registers the personal account and the personal payment account in the individual user management information in association with each other.

In a case where the information about the credit card is registered in the personal payment system 20, the individual user can reserve the booth 16. That is, the processor 42 of the reservation management system 12 permits an individual user to reserve the booth 16. Of course, the processor 42 may permit an individual user to reserve the booth 16 even in a stage where the information about the credit card is not registered in the personal payment system 20.

The personal user's name, e-mail address, password, and information about the credit card may be stored in the operation management system 10 and managed by the operation management system 10.

Here, the individual user management information will be described in detail with reference to FIG. 6. FIG. 6 illustrates an example of an individual user management table which is an example of the individual user management information. The data on the individual user management table is stored in the memory 40 of the reservation management system 12.

In the individual user management table, for example, for each user, a user ID, information indicating the type of the user, information indicating the name of the user, information indicating the e-mail address of the user, a password, information indicating a payment method, and a personal payment account are linked.

There are two types of users, individual users and corporate users. The user registered according to the steps described with reference to FIG. 5 is registered in the individual user management table as an individual user.

As described above, the individual user is required to input the information about the credit card, which is an example of the payment method, and the input information about the credit card is registered in the individual user management table as the information indicating the payment method.

Further, for an individual user, a personal payment account for making a payment by the personal payment system 20 is created and registered in the individual user management table.

As will be described later, the user registered as a corporate user is not requested to input the information about the credit card, which is an example of the payment method, and regarding the user registered as the corporate user, the information about the credit card is not registered in the individual user management table. Further, the personal payment account is not created, and the personal payment account is not linked to the corporate user.

The credit card is only an example of the payment methods, and other payment methods may be used. Further, a plurality of payment methods may be used. For example, electronic money, prepaid payment, debit card, cryptocurrency, cash transfer, or the like may be used as the payment methods.

For example, the accounts of user ID "0001" and user ID "0003" are personal accounts, and user A1 of user ID "0001" and user A2 of user ID "0003" are registered in the individual user management table as individual users. For example, in a case where the user A1 is registered in the reservation management system 12 according to the steps described with reference to FIG. 5, a personal account with the user ID "0001" is created, a personal payment account is created, and these accounts are registered in the individual user management table as information associated with the user ID "0001". The same applies to the user A2 having the user ID "0003".

As will be described later, the accounts of individual users belonging to the corporation are also registered in the individual user management table as corporate accounts. For example, the user A1 is also registered in the individual user management table as a user belonging to the corporation a. The account with user ID "0002" is a corporate account associated with user A1. The creation and registration of a corporate account will be described in detail later. In addition, the registered e-mail address may be the same for the personal account and the corporate account of the same user, and the registration of the same e-mail address may not be permitted.

For the service providing systems 14A and 14B, individual user management tables are created and stored in the service providing systems 14A and 14B, respectively.

The data on the individual user management table may be stored in the memory 32 of the operation management system 10, and each piece of information registered in the individual user management table may be managed by the operation management system 10.

As described above, in a case where the personal account and the personal payment account for the individual user are created and registered in the individual user management table, the individual user can reserve the booth 16.

The account used for SNS may be used as a personal account. In this case, the SNS account is shared by the service providing system, and the individual user can reserve the booth 16 by using his/her own SNS account.

For example, in a case where an individual user accesses the reservation management system 12 by using the terminal apparatus 26A, a login screen is displayed on the display of the terminal apparatus 26A. On the login screen, a field for entering information (for example, a user ID and a password) for logging in to the reservation management system 12 by using a personal account is displayed. In a case where the user enters the user ID and password on the login screen, the entered user ID and password are transmitted from the terminal apparatus 26A to the reservation management system 12. In a case where the entered user ID and password are registered in the individual user management table, the processor 42 of the reservation management system 12 permits the user to log in. In a case where the entered user ID and password are not registered in the individual user management table, the processor 42 of the reservation management system 12 does not permit the user to log in.

In a case where the login to the reservation management system 12 is permitted, the reservation screen is displayed on the display of the terminal apparatus 26A. The reservation screen is a screen for reserving the use of the booth 16. On the reservation screen, it is possible to search for the place where the booth 16 is installed, the booth 16 that can be reserved, and the usage time that can be reserved. A list of booths 16 that can be reserved and a list of usage times that can be reserved may be displayed. In a case where the user designates the booth 16 and the usage time and instructs the reservation on the reservation screen, the information indicating the designated booth 16 and usage time is transmitted from the terminal apparatus 26A to the reservation management system 12. The processor 42 of the reservation management system 12 registers the booth 16 and the usage time designated by the user in the reservation management information. This completes the reservation for the booth 16.

Further, the processor 42 of the reservation management system 12 creates usage information which is information necessary for using the booth 16 during the usage time, registers the usage information in the reservation management information in association with the reserved booth 16 and usage time, and transmits the usage information to the terminal apparatus 26A used for the reservation. The usage information may be displayed on the display of the terminal apparatus 26A, or may be stored in the memory 48 of the terminal apparatus 26A. The usage information is, for example, information including a password, key information, and the like. For example, the processor 42 of the reservation management system creates different type of usage information for each reservation. A user who uses the terminal apparatus 26A can use the booth 16 by using the usage information. For example, in a case where the booth 16 is locked, the usage information is used to unlock the booth 16. In addition, usage information may be used to indicate that the booth 16 is being used legitimately. For example, in a case where the booth 16 is a seat, a vehicle, or the like, usage information may be used to indicate that the seat, the vehicle, or the like is being used legitimately. The usage information may not be used in a case where the booth 16 is an open space or place, or in a case where the operation for using the booth 16 is unnecessary.

Hereinafter, the reservation management information will be described in detail with reference to FIG. 7. FIG. 7 illustrates an example of a reservation management table which is an example of reservation management information. The data on the reservation management table is stored in the memory 40 of the reservation management system 12.

In the reservation management table, for example, for each reservation of the booth 16, the reservation ID, the booth ID, the information indicating the usage time, the information about the user, and the usage information are linked.

The booth ID is an example of information for identifying the reserved booth 16. The booth ID is predetermined for each booth 16 and is associated with the booth 16 in advance.

The usage time is the time when the reserved booth 16 is used. For example, the usage time is designated when the user reserves the booth 16.

The information about the user includes user identification information for identifying the user who has reserved the booth 16, terminal identification information for identifying the terminal apparatus 26 used by the user, and the like. The user identification information includes, for example, information indicating a user's name, a user ID, information indicating a type of a user's account, an e-mail address, and the like. The terminal identification information is, for example, the address information (for example, IP address, MAC address, or the like) or serial number of the terminal apparatus 26. For example, when the user reserves the booth 16, information about the user is transmitted from the terminal apparatus 26 used for the reservation to the reservation management system 12, and is registered in the reservation management table.

The reservation management table will be described with a specific example. The booth 16 having the booth ID "B1" is reserved by the user A1 who is an individual user having the personal account of the user ID "0001". The usage time is from 10:00 to 11:00 on January 6th. In addition, usage information C1 is set as information for using the booth 16 from 10:00 to 11:00 on January 6th. This usage information C1 is transmitted from the reservation management system 12 to the terminal apparatus 26 used for the reservation.

In addition, the user A1 is also registered as a user belonging to a corporation, and the booth 16 having booth ID "B2" is reserved by the user A1 having a corporate account of the user ID "0002". The usage time is from 10:00 to 11:00 on January 7th. In addition, usage information C2 is defined as information for using the booth 16 from 10:00 to 11:00 on January 7th. This usage information C2 is transmitted from the reservation management system 12 to the terminal apparatus 26 used for the reservation.

Hereinafter, the process when the user uses the booth 16 will be described. Here, it is assumed that the booth 16 having the booth ID "B1" is used by the user A1 who has a personal account. Hereinafter, for convenience of explanation, the booth 16 having the booth ID "B1" will be referred to as "booth B1".

In a case where the user A1 performs an operation for using the booth B1, the processor 42 of the reservation management system 12 performs an authentication process for checking whether or not the user A1 is permitted to use the booth B1.

For example, the door of the booth B1 is locked by an electronic lock. The door is provided with a wireless communication device that performs short-range wireless communication. In a case where the user A1 brings the terminal apparatus 26A close to the door, the terminal apparatus 26A transmits usage information to the wireless communication device by using short-range wireless communication. As described above, the usage information is transmitted from the reservation management system 12 to the terminal apparatus 26A, when the user A1 reserves the booth B1, and is stored in the memory 48 of the terminal apparatus 26A. The wireless communication device that has received the usage information from the terminal apparatus 26A transmits the usage information and the booth ID of the booth B1 to the reservation management system 12 via the booth control device 18 or without passing through the booth control device 18. The processor 42 of the reservation management system 12 refers to the reservation management table illustrated in FIG. 7, and checks whether or not the usage information (for example, the usage information C1) associated with the transmitted booth ID and usage time including the current date and time, and the transmitted usage information match.

In a case where the transmitted usage information and usage information C1 match, the processor 42 of the reservation management system 12 permits the user A1 having a personal account to use the booth B1. In this case, the processor 42 of the reservation management system 12 transmits information indicating an instruction to unlock the door, to the wireless communication device provided on the door of the booth B1, via the booth control device 18 or without passing through the booth control device 18. The electronic lock is unlocked according to the unlocking instruction. In a case where the electronic lock is unlocked, the user A1 can open the door and enter the booth B1. Further, the processor 42 of the reservation management system 12 transmits information indicating the usage time, which is the time during which the booth B1 can be used, to the booth control device 18 by using the usage information C1. Information indicating the usage time is stored in the memory of the booth control device 18.

In a case where the transmitted usage information and the usage information C1 do not match, the processor 42 of the reservation management system 12 does not permit the user A1 to use the booth B1. In this case, the processor 42 of the reservation management system 12 does not transmit the information indicating the unlocking instruction. As a result, the electronic lock on the door of booth B1 is not unlocked.

For example, in a case where the current date and time is the time between 10:00 and 11:00 on January 6th, and the usage information transmitted to the reservation management system 12 and the usage information C1 match, the processor 42 of the reservation management system 12 permits the user A1 to use the booth B1. In a case where the current date and time is the time between 10:00 and 11:00 on January 6th, and the transmitted usage information and the usage information C1 do not match, the processor 42 of the reservation management system 12 does not permit the user A1 to use the booth B1. Further, even in a case where the transmitted usage information and the usage information C1 match, in a case where the current date and time is the time a date and time other than 10:00 and 11:00 on January 6th, the processor 42 of the reservation management system 12 does not permit the user A1 to use the booth B1.

The user ID, booth ID, and usage information may be transmitted from the terminal apparatus 26A to the reservation management system 12. In this case, the processor 42 of the reservation management system 12 checks whether or not the combination of the transmitted user ID and usage information matches the combination of the user ID associated with the usage information C1 and the usage information C1. In a case where these combinations match, the processor 42 permits the user A1 to use the booth B1, and in a case where these combinations do not match, the processor 42 does not permit the user A1 to use the booth B1.

For example, in a case where the end time of the usage time (for example, 11:00) has elapsed, the booth control device 18 transmits information indicating that the usage time has elapsed to the terminal apparatus 26A used by the user A1. The information indicating that the usage time has elapsed is displayed on the display of the terminal apparatus 26A. In addition, information indicating that the usage time has elapsed may be displayed on the display installed in the booth B1.

Ina case where the end time of the usage time (for example, 11:00) elapses and the user A1 leaves the booth B1, the electronic lock on the door of the booth B1 is locked. In a case where the end time has elapsed, the user A1 cannot unlock the electronic lock by using the usage information C1.

In a case where the booth 16 is used by using a personal account, a usage fee for the booth 16 is charged to the user having the personal account. In the above example, the usage fee of the booth B1 is charged to the user A1 having the user ID "0001". Payment is made by the personal payment system 20 for a user having a personal account.

Hereinafter, payment for a user having a personal account will be described in detail with reference to FIG. 8. FIG. 8 illustrates a flowchart showing the flow of payment for a user having a personal account.

The processor 42 of the reservation management system 12 refers to the reservation management table and creates usage record data, which is data indicating the usage record of the booth 16, for each user having a personal account (S10). To give a specific example, the processor 42 of the reservation management system 12 creates usage record data indicating the usage record of the user A1 who is an individual user. The same applies to other individual users.

For example, the processor 42 of the reservation management system 12 creates usage record data on a monthly basis. The usage record data includes billing data. The billing data is created based on the usage fee of the booth 16. The usage fee may be set for each booth 16, for example, or may be set depending on the length of usage time, or may beset depending on the usage status of the equipment installed in the booth 16. Even in a case where the booth 16 is not actually used during the reserved usage time, in a case where the reservation for using the booth 16 is not canceled, the user who has made the reservation is charged. In addition, a refund process and a discount process may be performed, and billing data reflecting these processes may be created. For example, the operator of the operation management system 10 may perform the refund process in response to a complaint from a user, or may perform the discount process based on a campaign or the like.

Next, the processor 42 of the reservation management system 12 transmits the usage record data of each individual user to the personal payment system 20 (S11). In a case where the operator of the operation management system 10 instructs the transmission of the usage record data, the usage record data may be transmitted to the personal payment system 20. In addition, the usage record may be displayed on the display of the terminal apparatus 26 used by the operator or the like of the operation management system 10.

Next, the personal payment system. 20 makes a payment for each individual user, based on the usage record data (S12). For example, the personal payment system 20 makes payments using a registered credit card. In a case where a payment method other than a credit card is registered, the payment may be made by the other payment method.

In a case where the payment is completed, the personal payment system 20 transmits the data on the payment result to the reservation management system 12. The processor 42 of the reservation management system 12 receives the payment result and updates the status of the usage record of each individual user (S13). For example, the processor 42 associates the user who has completed the payment with information indicating that the payment has been completed, in the individual user management table.

In a case where payment is made by the personal payment system 20, a money input process may be made from the personal payment system 20 to the administrator of the operation management system 10.

As described above, in a case where the user uses the booth 16 by using the personal account, the payment is made by the personal payment system 20.

Similarly, in a case where the user uses the service provided by the service providing systems 14A and 14B, the personal payment system 20 makes a payment. That is, the processor of the service providing system 14A transmits the usage record data of each individual user to the personal payment system 20. This usage record data is data showing the usage record of the service provided by the service providing system 14A. The same applies to the service providing system 14B. The personal payment system 20 individually makes payments for individual services used by individual users. That is, the payment for the use of the booth 16 provided by the reservation management system 12, the payment for the use of the service provided by the service providing system 14A, and the payment for the use of the service provided by the service providing system 14B are made separately.

Hereinafter, a process of withdrawing an individual user from the reservation management system 12 will be described with reference to FIG. 9. FIG. 9 illustrates a flowchart indicating the process. The scene where the individual user is withdrawn from the reservation management system 12 corresponds to an example of the scene where the contract for the individual user to use the service provided by the reservation management system 12 is canceled.

First, the user accesses the reservation management system 12 by using the terminal apparatus 26A, and logs in to the reservation management system 12 by using the user's personal account. In a case where the user logs in to the reservation management system 12 by using the personal account, a menu screen including a withdrawal menu is displayed on the display of the terminal apparatus 26A. In a case where the user logs in to the reservation management system 12 by using the corporate account, the withdrawal menu is not included in the menu screen. That is, only in a case where the user logs in to the reservation management system 12 by using the personal account, the withdrawal menu is included in the menu screen, and the withdrawal menu is displayed (S20).

In a case where the user instructs the withdrawal from the reservation management system 12 by using the terminal apparatus 26A (S21), the information indicating the instruction is transmitted from the terminal apparatus 26 to the reservation management system 12.

Upon receiving the withdrawal instruction, the processor 42 of the reservation management system 12 cancels all the reservations of the booth 16, associated with the user who withdraws (S22). For example, in a case where the user A logs in to the reservation management system 12 by using the user ID "0001" of the personal account and instructs the withdrawal from the reservation management system 12, the processor 42 of the reservation management system 12 cancels all reservations registered in the reservation management table in association with the user ID "0001". At this stage, the processor 42 of the reservation management system 12 does not delete the personal account of the user ID "0001" from the individual user management table.

Next, the processor 42 of the reservation management system 12 deletes, from the individual user management table, the personal account and the personal payment account of the user for which a predetermined time or more has elapsed since a withdrawal instruction is given, among users who have received the withdrawal instruction (S23). For example, when the processor 42 makes a payment (for example, monthly), the processor 42 checks among the users who have received the withdrawal instruction, a user for which a predetermined time (for example, two months) or more has elapsed since the instruction has been given, and deletes the personal account and the personal payment account of the user from the individual user management table. Further, the processor 42 transmits an instruction to delete the personal payment account to the personal payment system 20. The personal payment system 20 deletes the personal payment account registered in the personal payment system 20, according to the instruction.

The user may be re-registered in the reservation management system 12 as an individual user, until the personal account is deleted since the withdrawal instruction is given (that is, between steps S21 and S23). In this case, a new personal payment account (that is, a personal payment account different from the already registered personal payment account) is created, and registered in the reservation management system 12 and the personal payment system 20. As the information about the credit card linked to the new personal payment account, the information about the credit card linked to the already registered personal payment account may be used.

Hereinafter, a process of registering a corporate user in the reservation management system 12 will be described with reference to FIG. 10. FIG. 10 illustrates a flowchart indicating the process. The scene where the corporate user is registered in the reservation management system 12 corresponds to an example of the scene where the corporate user concludes a contract to use the service provided by the reservation management system 12.

First, a contract is concluded between the corporation and the operation company of the operation management system 10, contract information is created, and the contract defines services that can be used by each user belonging to the corporation (S30). For example, according to the contract, each user belonging to the corporation a can use the booth 16 provided by the reservation management system 12 and the service provided by the service providing system 14A.

Next, the operator of the operation management system 10 uses the terminal apparatus 26C registers in the corporate authentication system 22, among users who belong to the corporation a, a target user who is authorized to use the booth 16 provided by the reservation management system 12 (that is, a user who can use the booth 16) and a target user who is authorized to use the service provided by the service providing system 14A (that is, a user who can use the service) (S31). For example, an administrator screen is displayed on the display of the terminal apparatus 26C, and the administrator registers the target users in the corporate authentication system 22 on the administrator screen. For example, the administrator designates corporate identification information for identifying a corporation, user information regarding the target user, and information for identifying services that can be used by the target user. The processor 34 of the operation management system 10 registers these pieces of information in the corporate user management information of the corporate authentication system 22. The processor 42 of the reservation management system 12 may register the corporate identification information and the user information (for example, user identification information, e-mail address, or the like) about the target user who can use the booth 16 in the corporate user management information of the corporate authentication system 22. Similarly, the processor of the service providing system 14A registers the corporate identification information and the user information about the target user who can use the service provided by the service providing system 14A in the corporate user management information of the corporate authentication system 22.

Next, the guidance of user registration is notified to the target user (S32). For example, the processor 34 of the operation management system 10 notifies the target user of the guidance of user registration to the service that can be used by the target user via e-mail or the like. For example, the processor 34 of the operation management system 10 notifies the target user who is authorized to use the booth 16 of the guidance of user registration to the reservation management system 12, and notifies the target user who is authorized to use the service provided by the service providing system 14A of the guidance of user registration to the service providing system 14A. The processor 42 of the reservation management system 12 may notify the target user who is authorized to use the booth 16 of the guidance of user registration to the reservation management system 12, and the processor of the service providing system 14A may notify the target user who is authorized to use the service provided by the service providing system 14A of the guidance of user registration to the service providing system 14A.

The target user who is notified of the guidance of user registration performs user registration to the service for which he or she has the usage authority (S33). Hereinafter, user registration to the reservation management system 12 will be described.

In a case where the target user uses the terminal apparatus 26B to access the reservation management system 12 and requests the reservation management system 12 for registration of a corporate user, a screen for registering the user as a corporate user in the reservation management system 12 is displayed on the display of the terminal apparatus 26B. In a case where the target user inputs information such as the user's own name, e-mail address, and password on the screen by using the terminal apparatus 26B, these pieces of information are transmitted from the terminal apparatus 26B to the reservation management system 12. The processor 42 of the reservation management system 12 registers these pieces of information in the individual user management information, creates a corporate account, and issues the corporate account to the target user. For example, the processor 42 creates a user ID associated with the corporate account, registers the user ID in the individual user management information, and transmits the user ID to the terminal apparatus 26B. Thus, the user is notified of the user ID. The user ID may be determined by the user, input to the reservation management system 12, and registered in the individual user management information. The user ID and password associated with the corporate account are used for the user to log in to the operation management system 10 and the reservation management system 12 by using the corporate account. For example, the user ID and password are transmitted to the corporate authentication system. 22 and registered in the corporate user management information. Further, the user ID and password may be stored in the operation management system 10.

For example, the processor 42 of the reservation management system 12 checks whether or not the user who requests for the registration of the corporate user is registered in the corporate user management information as a target user who has the authority to use the service provided by the reservation management system 12. For example, the processor 42 may refer to the corporate user management information, or may inquire the corporate authentication system 22 about the checking. For example, in a case where the user who requests for the registration of the corporate user is registered in the corporate user management information as a target user who has the authority to use the service provided by the reservation management system 12, the processor 42 registers the user as a corporate user. For example, in a case where the user who requests for the registration of the corporate user is not registered in the corporate user management information as a target user who has the authority to use the service provided by the reservation management system 12, the processor 42 does not register the user as a corporate user.

As described above, in a case where the target user is registered in the reservation management system 12 as a corporate user and a corporate account is issued, the target user uses the corporate account to log in to the operation management system 10 and the reservation management system 12 and can reserve the booth 16. That is, the processor 42 of the reservation management system 12 permits a corporate user to reserve the booth 16. The same applies to the service providing system 14A.

The name, e-mail address, password, and the like of the corporate user may be stored in the operation management system 10 and managed by the operation management system 10.

Here, the corporate user management information will be described in detail with reference to FIG. 11. FIG. 11 illustrates an example of a corporate user management table which is an example of corporate user management information. The data on the corporate user management table is stored in the corporate authentication system 22.

In the corporate user management table, for example, for each corporation, the corporation ID, the information indicating the corporation name, the information indicating the name of the user belonging to the corporation, the information indicating the user's e-mail address, information indicating the services that can be used by the user, and information indicating the presence or absence of the usage authority given to the user are linked. Further, the user ID and password of each user are registered in the corporate user management table.

For example, users A1 and A2 are registered as corporate users belonging to corporation a. Users A1 and A2 have the authority to use the booth 16 provided by the reservation management system 12 and the service provided by the service providing system 14A.

Further, the user A1 is registered in the reservation management system 12 as a corporate user. For example, as illustrated in FIG. 6, the user A1 is registered in the individual user management table as a corporate user, and is given the user ID "0002". The same applies to the user A2. Since the corporate user is not charged, the payment method and the personal payment account are not linked to the corporate user.

For example, the user A1 uses the user ID "0002" and the password associated with the user ID to log in to the reservation management system 12 as a corporate user and make a reservation for the use of the booth 16. The reservation method is the same as the method with which an individual user reserves the use of the booth 16. For example, as illustrated in FIG. 7, the booth 16 having the booth ID "B2" is reserved by the user A1 who is a corporate user. The user A1 can unlock the electronic lock on the door of booth 16 and use booth 16 as a corporate user, by using usage information C2 from 10:00 to 11:00 on January 7th.

The user A1 is also registered as an individual user in the individual user management table. Therefore, the user A1 may reserve the use of the booth 16 by using the personal account, or may reserve the use of the booth 16 by using the corporate account. In a case where the booth 16 is reserved and used by using the personal account, the personal payment system 20 charges the user A1. In a case where the booth 16 is reserved and used by using the corporate account, the user A1 is not charged, but the corporate payment system 24 charges the corporate a to which the user A1 belongs.

For example, in a case where a corporate user accesses the operation management system 10 by using the terminal apparatus 26B, a login screen is displayed on the display of the terminal apparatus 26B. On the login screen, a field for entering information (for example, a user ID and a password) for logging in to the operation management system 10 by using a corporate account is displayed. In a case where the user enters the user ID and password on the login screen, the entered user ID and password are transmitted to the corporate authentication system 22 from the terminal apparatus 26B via the operation management system 10 or without passing through the operation management system 10. The corporate authentication system 22 authenticates the user who has requested the login, permits login to the operation management system 10, in a case where the authentication is successful, and does not permit login to the operation management system 10, in a case where the authentication is not successful. For example, the corporate authentication system. 22 permits login to the operation management system 10, in a case where the entered user ID and password are registered in the corporate user management table, and does not permit login to the operation management system 10, in a case where the entered user ID and password are not registered in the corporate user management table. The operation management system 10 may determine whether to permit or not permit login.

In a case where the login to the operation management system 10 is permitted, the service selection screen is displayed on the display of the terminal apparatus 26B. On the service selection screen, a list of services for which the logged-in user A1 has usage authority is displayed. For example, the processor 34 of the operation management system 10 specifies the service for which the user A has the usage authority by referring to the corporate user management table, and displays a list of the specified services on the service selection screen.

In a case where the user A1 selects a service on the service selection screen, a screen for reserving the use of the selected service is displayed on the display of the terminal apparatus 26B. For example, in a case where the booth 16 is selected, the reservation screen is displayed on the display of the terminal apparatus 26B. The user A1 can reserve the booth 16 on the reservation screen.

For example, as illustrated in FIG. 7, a booth 16 having a booth ID "B2" is reserved by a user A1 who is a corporate user having a corporate account with a user ID "0002". The usage time is from 10:00 to 11:00 on January 7th. In addition, usage information C2 is defined as information for using the booth 16 from 10:00 to 11:00 on January 7th. This usage information C2 is transmitted from the reservation management system 12 to the terminal apparatus 26B used for the reservation.

The process when the user A1 who is a corporate user uses the booth 16 is the same as the process when the individual user uses the booth 16, but the payment method is different. In a case where the booth 16 is used by using a corporate account, a usage fee for the booth 16 is charged to the corporation a to which the user A1 having the corporate account belongs. The payment for a corporation is performed by the corporate payment system 24.

Hereinafter, the payment for a corporation will be described in detail with reference to FIG. 12. FIG. 12 illustrates a flowchart showing the flow of payment for a corporation.

The processor of each service providing system creates usage record data, which is data indicating the usage record of the service provided by itself, for each corporation (S40). For example, the processor 42 of the reservation management system 12 refers to the reservation management table and creates usage record data, which is data indicating the usage record of the booth 16, for each corporation. To give a specific example, the processor 42 of the reservation management system 12 creates usage record data indicating the usage record of all users belonging to the corporation a. The same applies to other corporations. The same applies to the service providing systems 14A and 14B.

For example, the processor of each service providing system creates usage record data on a monthly basis. The usage record data includes billing data. Billing data is created based on the usage fee of the service. For example, the usage fee may be set for each service, may be set depending on the length of usage time, or may be set according to the usage status of the equipment. Even in a case where the service is not actually used during the reserved usage time, in a case where the reservation for using the service is not canceled, the user who has made the reservation is charged. In addition, a refund process and a discount process may be performed, and billing data reflecting these processes may be created. For example, the operator of the operation management system 10 may perform the refund process in response to a complaint from a user, or may perform the discount process based on a campaign or the like.

Next, for each corporation, usage record data for all services used by all users belonging to the corporation is transmitted to the corporate payment system 24 (S41). This transmission is performed under the control of the operation management system 10. The operation management system 10 grasps the usage record of the service provided by each service providing system, and each service providing system transmits the usage record data of each corporation to the corporate payment system 24, according to the instruction of the operation management system 10.

Next, the corporate payment system 24 makes a payment for each corporation, based on the usage record data (S42). The corporate payment system 24 calculates the total usage fee indicated by the usage record data of all services for each corporation, and charges the corporation for the total usage fee. For example, in a case where the service provided by the booth 16 and the service providing system 14A is used by a user belonging to the corporation a, the usage record data of the booth 16 and the usage record data of the service provided by the service providing system 14A are transmitted to the corporate payment system 24. The corporate payment system 24 calculates the total of the usage fee indicated by the usage record data of the booth 16 and the usage fee indicated by the usage record data of the service provided by the service providing system 14A, and charges the corporation a for the total usage fee. In this way, payments for all services are collectively made for each corporation. The total usage fee may be calculated by the operation management system 10, the reservation management system 12, or another service providing system. Of course, payment may be made for each service.

In a case where the payment is completed, the corporate payment system 24 transmits the data on the payment result to the corporate authentication system 22. In the corporate authentication system 22, the status of the usage record of each corporation is updated in response to the payment result (S43). For example, the corporate authentication system 22 associates information indicating that payment has been completed with a corporation whose payment has been completed, in the corporate user management table.

In a case where payment is made by the corporate payment system 24, a money input process may be made from the corporate payment system 24 to the administrator of the operation management system 10.

As described above, in a case where the service is used by a corporate user, the individual user is not charged, but the corporate payment system 24 charges the corporation to which the corporate user belongs.

In a case where the service is used by using the personal account, the payment is made by the personal payment system 20, and in a case where the service is used by using the corporate account, the payment is made by the corporate payment system 24. By doing so, the load on the payment system is reduced as compared with the case where the payment for the individual user and the payment for the corporation are performed by the same payment system (for example, the corporate payment system 24).

Hereinafter, a process of withdrawing a corporate user from the operation management system 10 will be described with reference to FIG. 13. FIG. 13 illustrates a flowchart indicating the process. The scene in which the corporate user is withdrawn from the operation management system 10 corresponds to an example of the scene in which the usage authority of the corporate user is suspended.

First, the operator of the operation management system 10 suspends the usage authority of the target user, according to a contract with a corporation or the like (S50). For example, the operator screen is displayed on the display of the terminal apparatus 26C used by the operator or the like. The operator or the like gives an instruction to suspend the usage authority of the target user, on the operator screen. The information indicating the instruction is transmitted from the terminal apparatus 26C to the operation management system 10.

Next, the processor of each service providing system cancels all reservations for using the service associated with the target user whose usage authority has been suspended, under the control of the operation management system 10 (S51). For example, the processor 42 of the reservation management system 12 cancels all reservations for the booth 16 associated with the target user whose usage authority for the booth 16 has been suspended. For example, in a case where the usage authority of the user A having the user ID "0002" of the corporate account is suspended, all the reservations associated with the user ID "0002" and registered in the reservation management table are canceled. In a case where there is a reservation for refund, information indicating that fact may be transmitted to the person in charge of the corporation, the operator of the operation management system 10, or the like, via e-mail or the like. The process of step S51 may be performed in a predetermined time zone (for example, at night).

A user whose usage authority has been suspended is not permitted to log in to the operation management system 10 by using a corporate account, and is not permitted to reserve and use the services provided by each service providing system.

In addition, all or part of the contract may be canceled. For example, in a case where all of the contracts are canceled, the usage authorities of all users belonging to the corporation will be suspended. As a partial cancellation of the contract, the number of users registered as corporate users who have usage authority may be reduced. For example, in a case where 100 users belong to the same corporation and are registered as corporate users having usage authority, the number of corporate users having usage authority may be reduced. For example, the number may be reduced to 50 people.

In the above-described exemplary embodiment, the example in which the booth 16 is provided has been described, but even in a case where a place other than the booth 16 is provided, the above-described reservation process and payment process may be performed. For example, all or part of the place where a certain business is conducted may be reserved and used by the user, and payment may be made for the use. The place where the business is conducted is, for example, an office, a restaurant, a supermarket, a convenience store, an entertainment facility, or the like. These are only examples of places where business is carried out, and the places may be places where some kind of business is carried out. For example, all or part of the place where the business is conducted (for example, a restaurant) may be rented as a place used for purposes other than the business (for example, the restaurant business).

Hereinafter, the information processing system according to the present exemplary embodiment will be described in more detail.

Preparation for Service Provision

The preparation for providing a service will be described below. Here, as an example, preparation of a service that provides a place to a user will be described. Specifically, the preparation of the service for providing the booth 16 to the user will be described.

Figure 14:
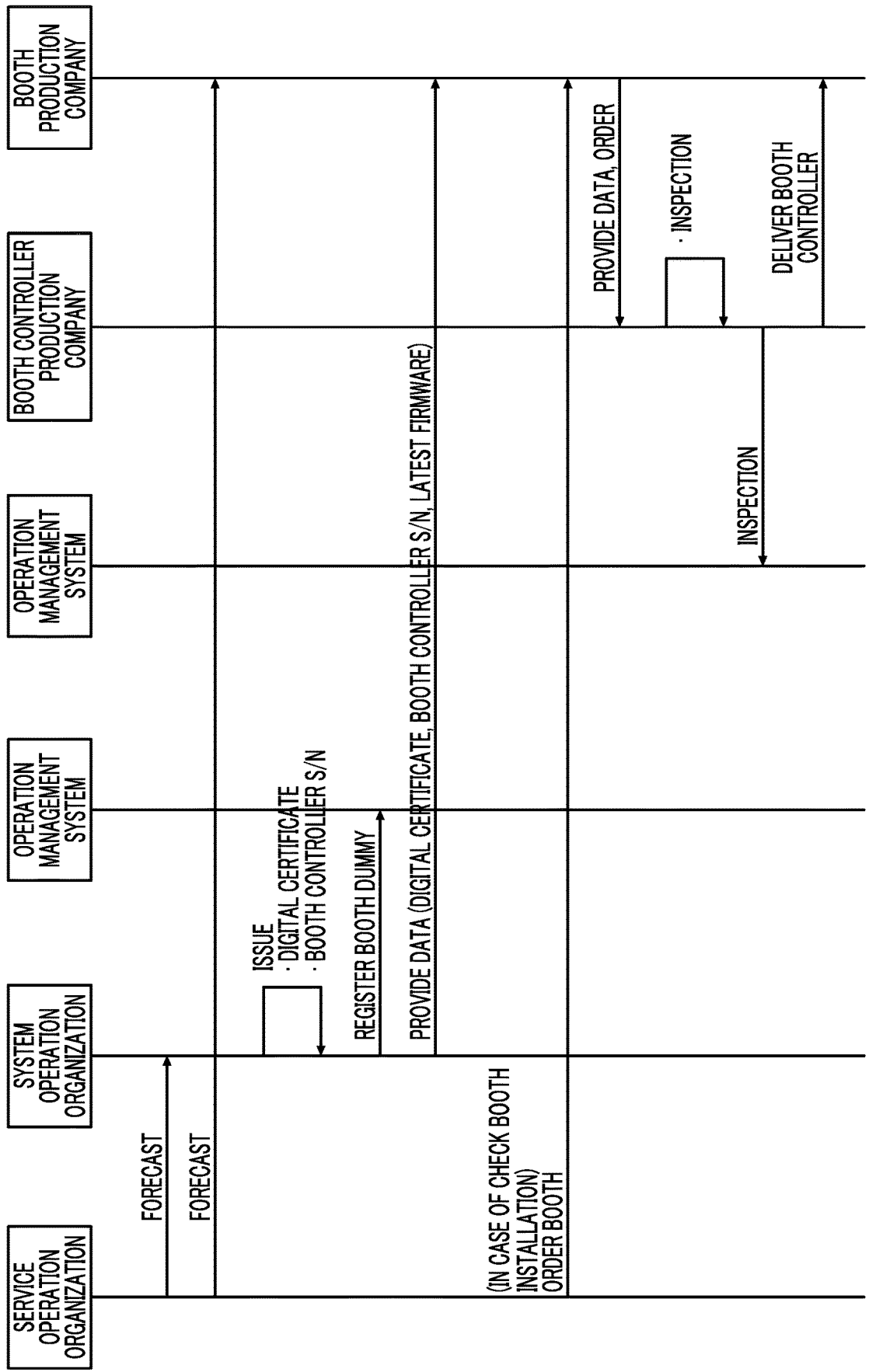
FIG. 14 is a sequence diagram illustrating a flow of a booth production stage.

The flow of the production stage of the booth 16 will be described with reference to FIG. 14. FIG. 14 illustrates an example of the flow at the stage. The flow illustrated in FIG. 14 is only an example, and other operations may be performed.

First, before the production of the booth 16, the service operation organization that supervises the operation of the rental service of the booth 16 notifies the system operation organization that operates the information processing system according to the present exemplary embodiment and the booth production company of the installation schedule of the booth 16 (forecast). For example, the number of booths 16 installed is notified.

Next, the system operation organization issues a digital certificate necessary for operating the booth 16, a serial number (S/N) of the booth control device 18 that controls the booth 16, and the like.

Next, the booth 16 is registered as a dummy in the operation management system 10. For example, the above digital certificate or serial number is registered.

Next, the data required for the production of the booth 16 is provided from the system operation organization to the booth production company. For example, the above digital certificate, serial number, latest firmware, or the like are provided.

After the installation of the booth 16 is checked in the service operation organization, a notification of an order for the booth 16 is provided from a service operation organization to a booth production company. The booth production company produces the booth 16 based on the order.

Next, the digital certificate, serial number, latest firmware, and the like are provided from the booth production company to the booth controller production company. The booth control device 18 is produced by the booth controller production company, and the booth control device 18 is delivered from the booth controller production company to the booth production company. In addition, the booth control device 18 is inspected.

Figure 15:
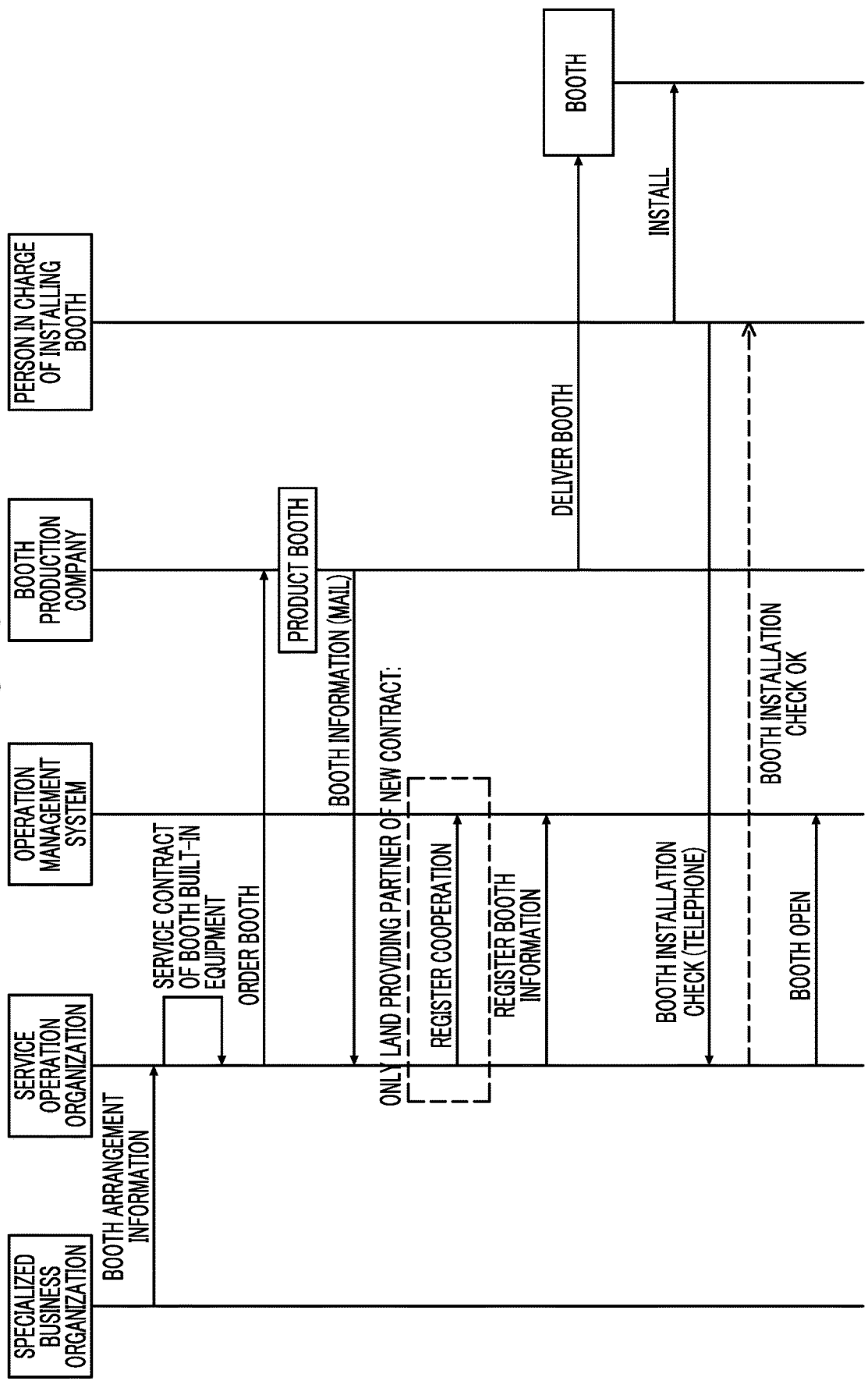
FIG. 15 is a sequence diagram illustrating a flow of a booth installation stage.

Hereinafter, the flow of the installation stage of the booth 16 will be described with reference to FIG. 15. FIG. 15 illustrates an example of the flow at the stage. The flow illustrated in FIG. 15 is only an example, and other operations may be performed.

First, the organization that sells the installation of the booth 16 provides the service operation organization with booth arrangement information.

Next, the service operation organization makes a contract for the equipment to be installed in the booth 16, and orders the booth 16 from the booth production company.

Upon receiving the order, the booth production company produces the booth 16 and sends the information on the booth to the service operation organization. Examples of information on the booth 16 include the serial number of the booth 16, the serial number of the booth control device 18, order information, and the like.

Next, the service operation organization registers, in the operation management system 10, the information on the company that actually provides the rental service of the booth 16 and the information on the booth 16. The information on the booth 16 to be registered includes the serial number of the booth 16, the serial number of the booth control device 18, the information indicating the installation place of the booth 16, the information indicating the business days when the booth 16 can be used, and the like. In a case where the information on the booth 16 is registered in the operation management system 10, the above dummy registration is deleted from the operation management system 10.

Figure 16:
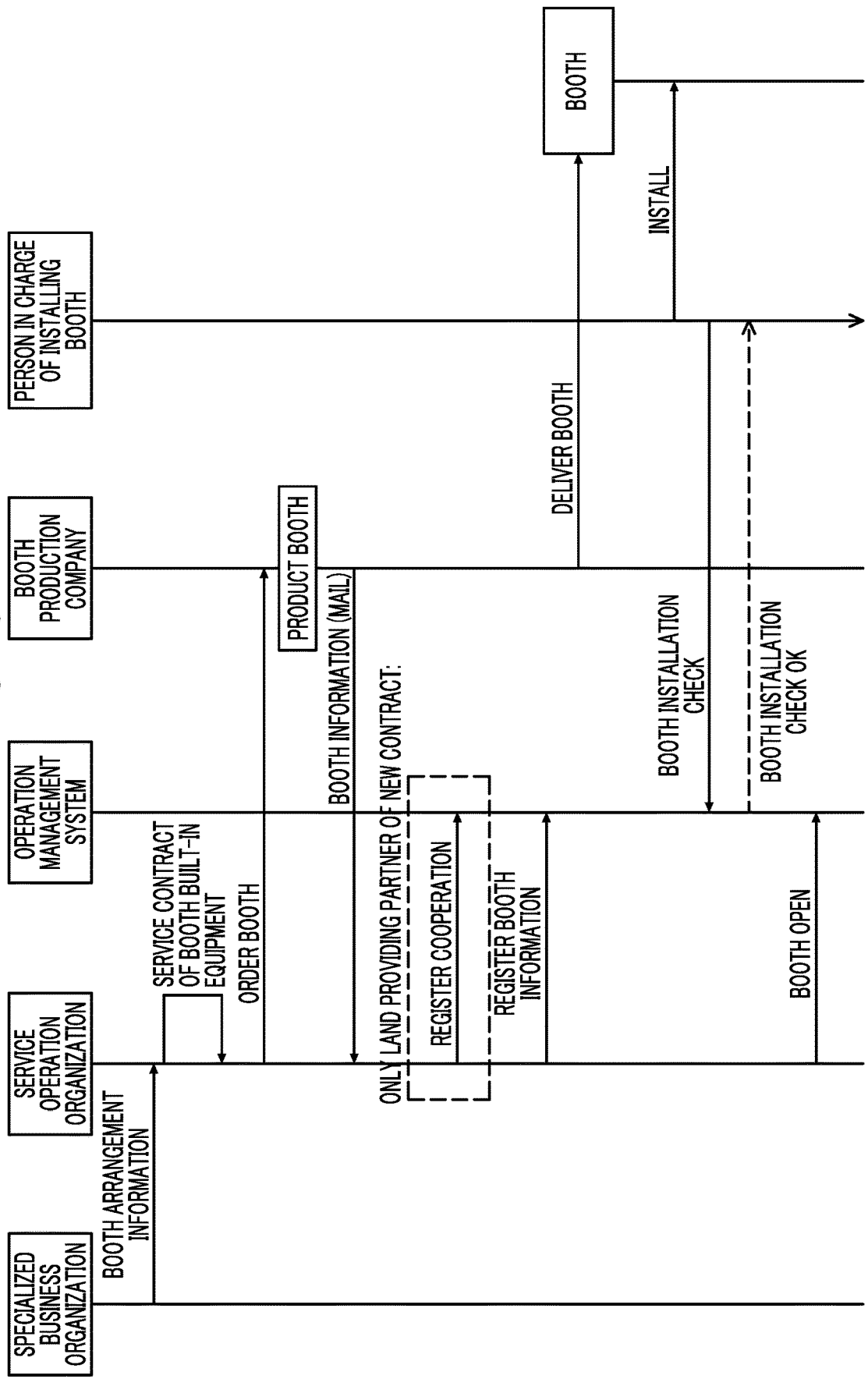
FIG. 16 is a sequence diagram illustrating a flow of the booth installation stage.

Next, the booth production company delivers the booth 16 to the installation place, and the person in charge of the booth installation installs the booth 16 at the installation place. The person in charge of the booth installation contacts the service operation organization to check the installation of the booth 16. For example, the opening/closing of the electronic lock and the log of the sensor are checked. As illustrated in FIG. 16, the check notice may be sent from the person in charge of the booth installation to the operation management system 10.

In a case where the above work and procedures are completed, the booth 16 will be open to the public. That is, the booth 16 can be reserved and used via the operation management system 10.

Figure 17:
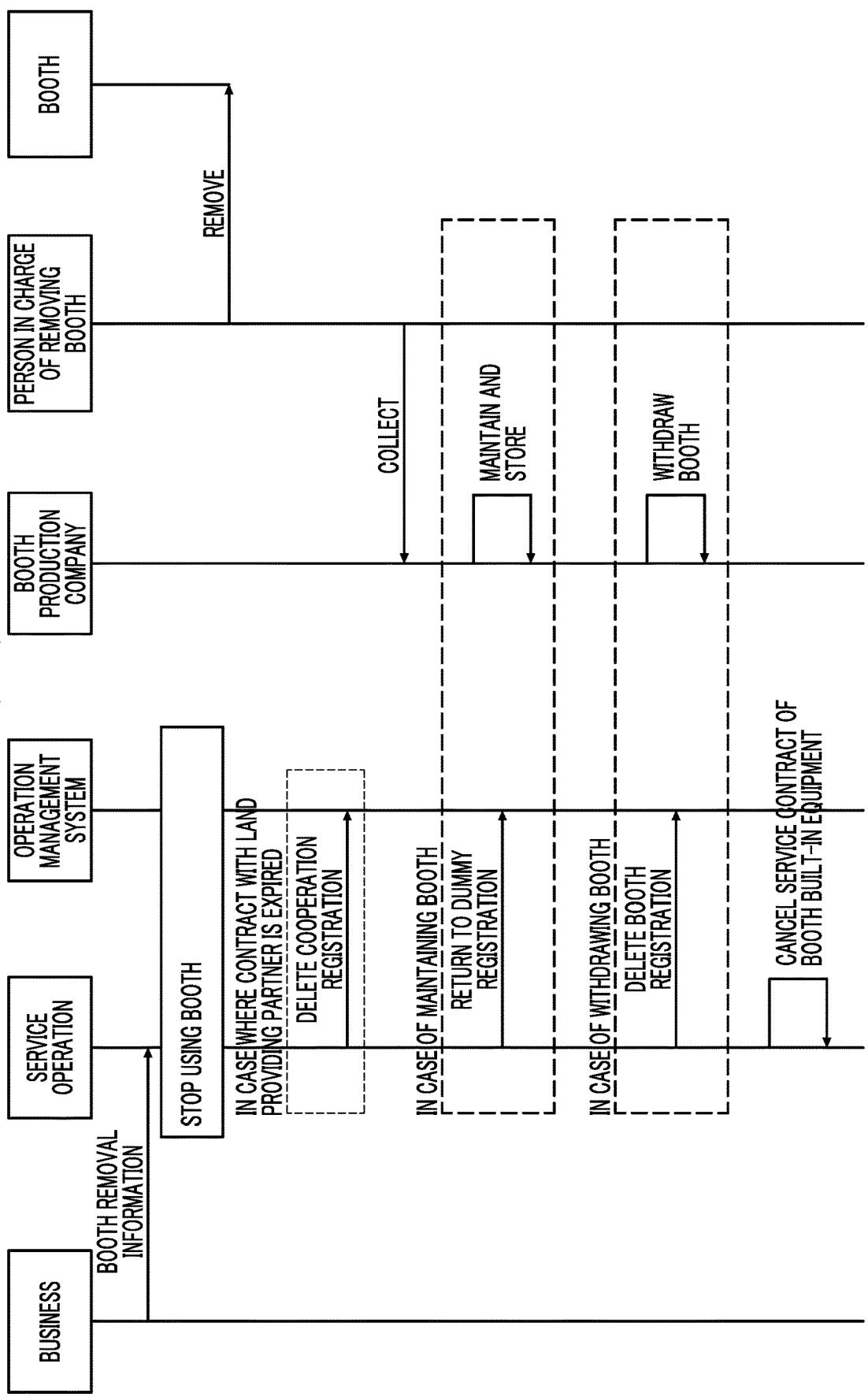
FIG. 17 is a sequence diagram illustrating a flow of a booth removal stage.

Hereinafter, the flow of the stage of removing the booth 16 will be described with reference to FIG. 17. FIG. 17 illustrates an example of the flow of the stage. The flow illustrated in FIG. 17 is only an example, and other operations may be performed.

First, the business organization informs the service operation organization that the booth 16 will be removed. The service operation organization will stop using the booth 16 to be removed.

The registration of the company that has provided the rental service of the booth 16 is deleted from the operation management system 10. Further, the booth 16 is removed by the person in charge of removing the booth, and the removed booth 16 is collected by the booth production company.

In a case where the booth 16 is maintained, the service operation organization returns the registration of the booth in the operation management system 10 to the dummy registration. The booth production company maintains and stores the booth 16.

In a case where the booth 16 is destroyed, the service operation organization deletes the registration of the booth from the operation management system 10. The booth production company destroys the booth 16.

Next, the contract for the equipment installed in the booth 16 is canceled.

Figure 18:
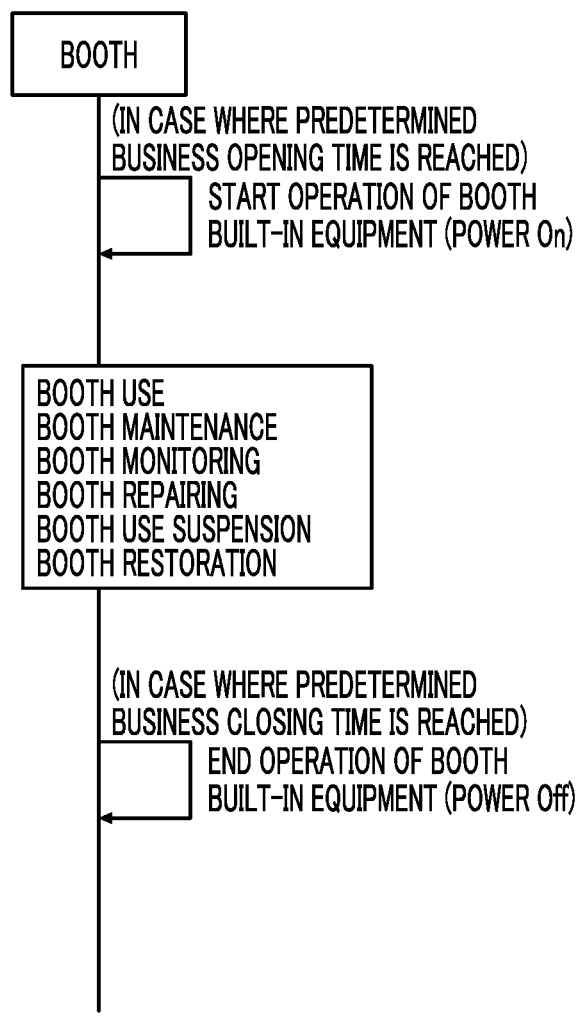
FIG. 18 is a flowchart illustrating a flow from a start to an end of business in a booth.

Hereinafter, the start and end of business of the booth 16 will be described with reference to FIG. 18. FIG. 18 illustrates an example of the flow from the start to the end of the business of the booth 16.

In a case where the predetermined business start time is reached, the booth control device 18 turns on the power of the equipment provided in the booth 16. For example, the booth control device 18 turns on the power of the air conditioner provided in the booth 16.

After the start of business, the use, maintenance, monitoring, repairing, use suspension, and restoration of the booth 16 are performed.

In a case where the predetermined business closing time is reached, the booth control device 18 turns off the power of the equipment provided in the booth 16. For example, the booth control device 18 turns off the power of equipment such as lighting, a display, a circulator, and an air conditioner provided in the booth 16.

Figure 19:
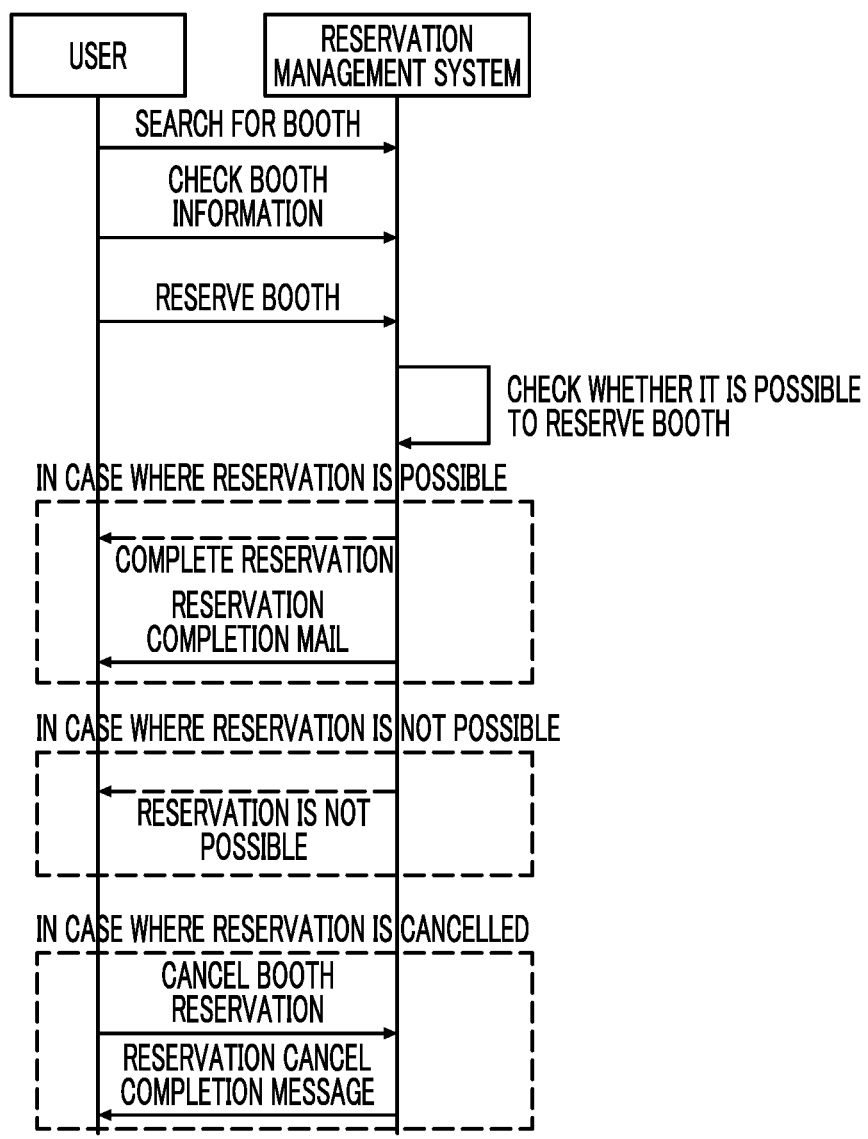
FIG. 19 is a flowchart illustrating a flow of reservation and cancellation of a booth.

Hereinafter, reservation and cancellation of the booth 16 will be described with reference to FIG. 19. FIG. 19 illustrates an example of the flow of reservation and cancellation of the booth 16.

First, the user accesses the reservation management system 12 by using the terminal apparatus 26 and searches for the booth 16. The user may access the operation management system 10 and search for the booth 16. The search condition may include the place, the presence or absence of equipment, and the like. The user checks the information on the booth 16 to be used from the search results, and requests the reservation management system 12 to make a reservation for the booth 16. Examples of the information on the booth 16 include information indicating the name of the booth 16, the installation place, the map, the equipment, the status of the booth 16, and the like.

The reservation management system 12 checks whether or not the booth 16 to be reserved can be reserved, and in a case where the reservation is possible, the reservation management system 12 informs the user of information indicating that the reservation has been completed. For example, a reservation completion e-mail is sent to the user. For example, in a case where the rental service of the booth 16 is being provided, it is determined that the booth 16 can be used. Further, in a case where the user has the right to use the booth 16, it may be determined that the booth 16 can be used. Further, the upper limit of the usage time of the booth 16 is set for each user, each corporation, or each month, and in a case where the usage time of the user is less than the upper limit, it may be determined that the booth 16 can be used.

In a case where the reservation is not possible, the reservation management system 12 informs the user of the information indicating that the reservation is not possible.

Further, in a case where the user cancels the reservation, the reservation management system 12 informs the user of information indicating that the reservation has been canceled.

Payment

The flow of payment will be described in detail below.

Figure 20:
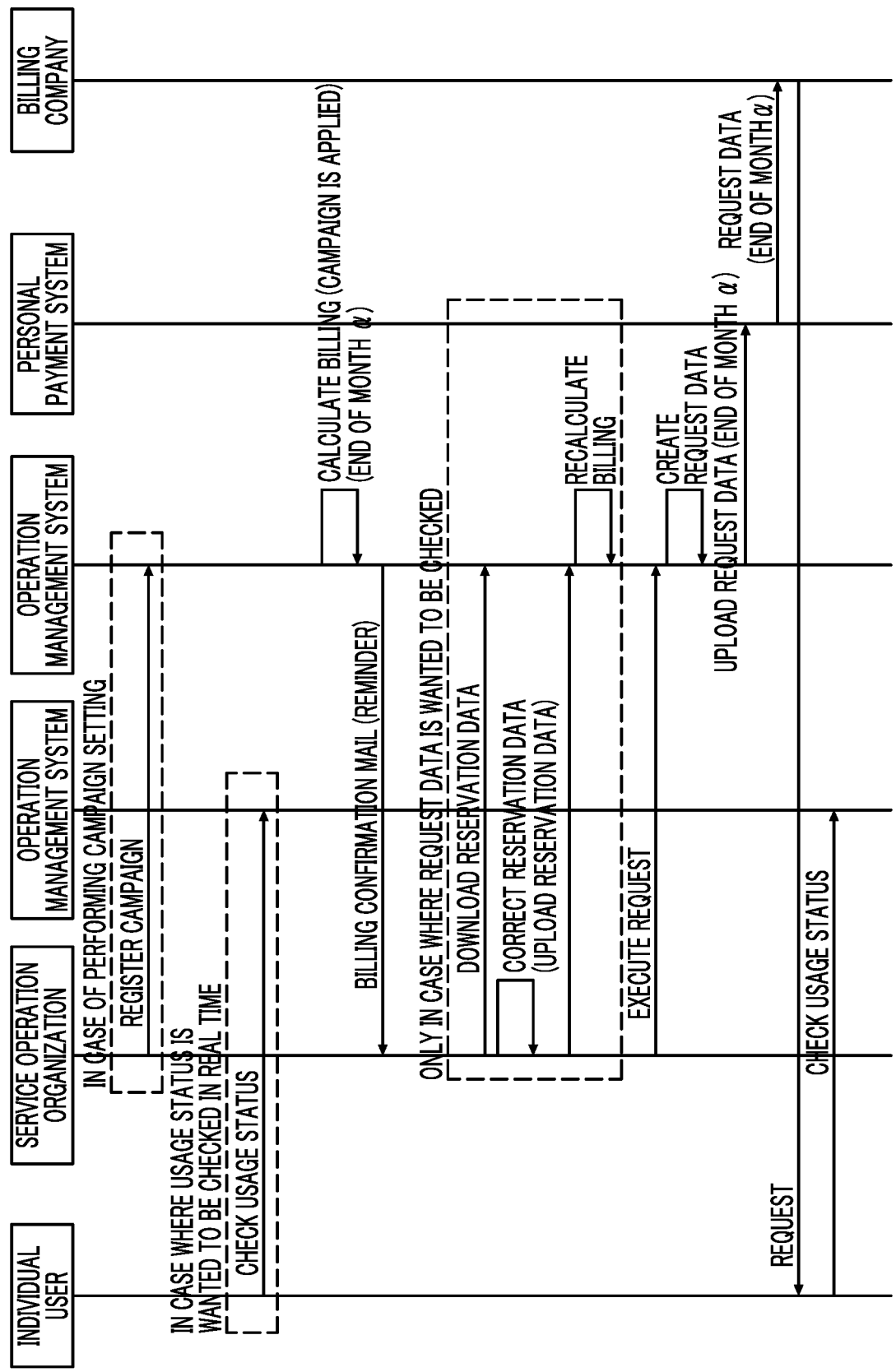
FIG. 20 is a sequence diagram illustrating a flow of payment by an individual user.

The payment by an individual user will be described with reference to FIG. 20. FIG. 20 illustrates an example of the flow of payment by an individual user.

In a case where the service operation organization sets a campaign related to the use of the booth 16 (for example, a campaign such as a discount), the service operation organization registers the campaign in the operation management system 10.

The individual user can check the usage status of the booth 16 of the individual user himself/herself by using the terminal apparatus 26A.

The operation management system 10 calculates the usage fee of each user for each predetermined period (for example, the end of the month), and transmits information (for example, an e-mail) indicating checking of the billing request to the service operation organization.

The service operation organization can check the billing request. For example, the service operation organization can download the data related to the reservation of the booth 16 and the data related to the use from the operation management system. 10, check the contents of the data, or correct the data. In a case where the data is corrected, the usage fee will be recalculated.

In a case where the service operation organization instructs the execution of the billing request, the operation management system 10 creates data on the billing request and uploads the data on the billing request to the personal payment system 20.

The personal payment system 20 sends the data on the billing request to a billing company that actually charges or collects fees. The billing company charges individual users for billing.

Figure 21:
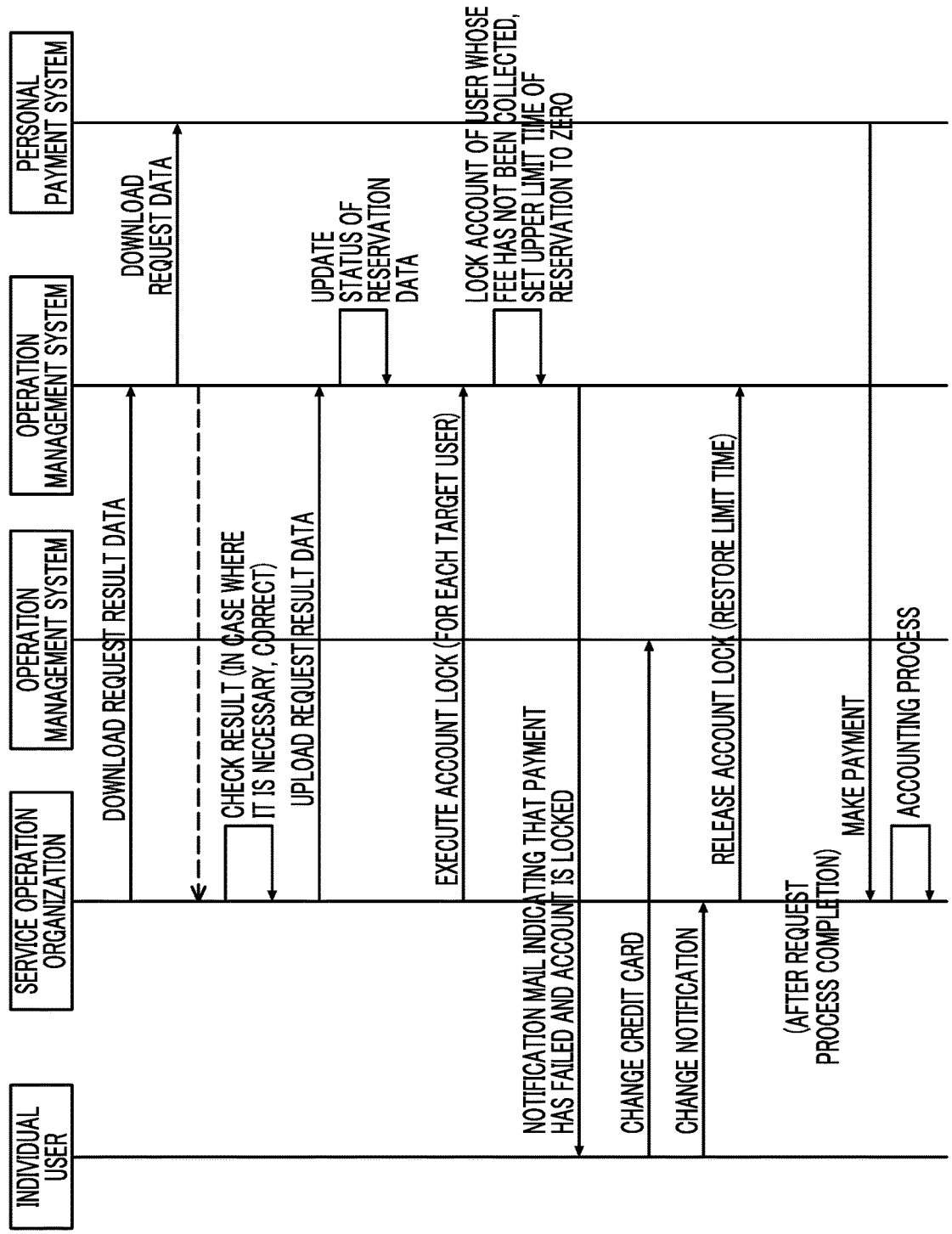
FIG. 21 is a sequence diagram illustrating a flow of payment by an individual user.

Another example of payment by an individual user will be described with reference to FIG. 21. FIG. 21 illustrates an example of the flow of payment by an individual user.

First, in a case where the service operation organization requests the operation management system 10 to download the data on the billing request, the operation management system 10 downloads the data on the billing request from the personal payment system 20 and sends the data to the service operation organization.

The service operation organization checks the contents of the data on the billing request, corrects the contents in a case where correction is necessary, and uploads the data to the operation management system 10.

The operation management system 10 may update the status of the reservation data of the booth 16.

In a case where payment for an individual user fails (for example, in a case where the expiration date of the credit card has elapsed), the service operation organization requests the operation management system 10 to lock the account (for example, account suspension or deletion), for each individual user who has failed payment. The service operation organization may request the operation management system 10 to lock the account for all individual users whose payment has failed.

The operation management system 10 locks the account of the user who has failed in payment (that is, the user whose fee has not been collected), and sets the upper limit time of reservation to zero. The operation management system 10 sends information indicating that the payment has failed and the account is locked to the individual user. For example, an e-mail containing the information is sent to an individual user. An individual user whose account is locked may be able to log in to the operation management system 10. Even in this case, the individual user cannot reserve the booth 16.

In a case where an individual user registers a valid payment method in the operation management system 10 (registers, for example, a credit card whose expiration date has not elapsed in the operation management system 10) and informs the service operation organization of that fact, the service operation organization requests the operation management system 10 to release the account lock of the individual user. In response to the request, the operation management system 10 releases the account lock of the individual user and changes the upper limit time for reservation from zero to a predetermined value (non-zero value). The operation management system 10 may update the status of the reservation data.

The payment by an individual user is made by the personal payment system 20, and payment is made to the service operation organization.

Figure 22:
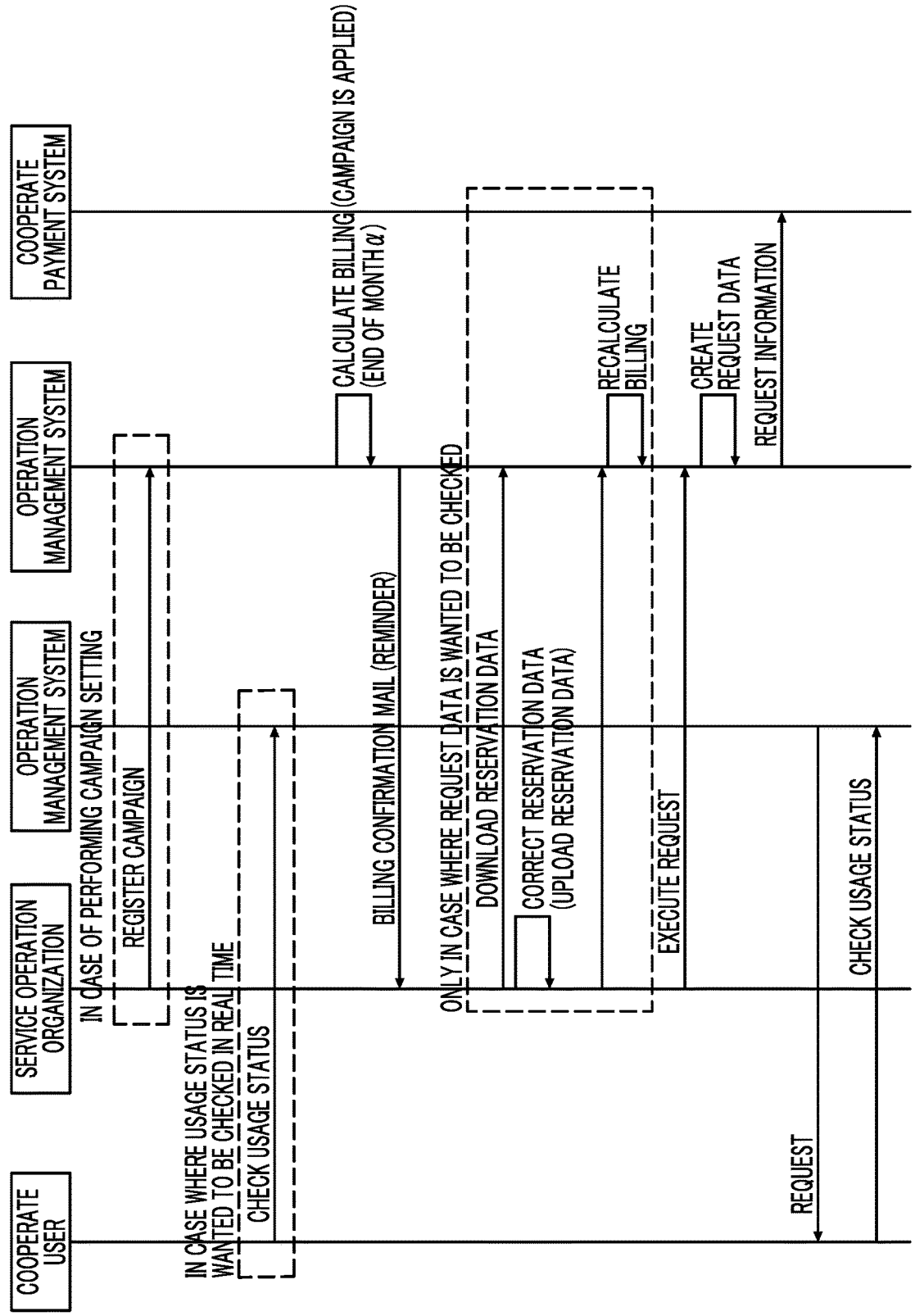
FIG. 22 is a sequence diagram illustrating a flow of payment by a corporate user.

The payment by a corporate user will be described with reference to FIG. 22. FIG. 22 illustrates an example of the flow of payment by a corporate user.

In a case where the service operation organization sets a campaign related to the use of the booth 16, the service operation organization registers the campaign in the operation management system 10.

The corporate user can check the usage status of the booth 16 of the corporation to which the corporate user belongs by using the terminal apparatus 26B.

The operation management system 10 calculates the usage fee of each corporation for each predetermined period (for example, the end of the month), and transmits information (for example, an e-mail) indicating checking of the billing request to the service operation organization.

The service operation organization can check the billing request. For example, the service operation organization can download the data related to the reservation of the booth 16 and the data related to the use from the operation management system. 10, check the contents of the data, or correct the data. In a case where the data is corrected, the usage fee will be recalculated.

In a case where the service operation organization instructs the execution of the billing request, the operation management system 10 creates data on the billing request and uploads the data on the billing request to the corporate payment system 24.

The corporate payment system 24 charges the corporation based on the data on the billing request.

Hereinafter, various examples will be described.

Example 1

Hereinafter, Example 1 will be described. In Example 1, in a case where a specific condition is satisfied, by the reservation management system 12, a process of renting all or apart of the place where the business is conducted (hereinafter referred to as "business place") as a place used for purposes other than the business is executed.

The above-described business is not particularly limited and may be any business. For example, the business is a restaurant business, and the business place is a store (for example, a restaurant) where the restaurant business is conducted. Of course, businesses other than the restaurant business may be conducted. For example, all or part of the restaurant where the restaurant business is conducted is rented as a place used for purposes other than the restaurant business. A business place (for example, a restaurant) is registered in advance in the reservation management system 12, and reservations for rental of all or part of the business place are made by the reservation management system 12 in the same manner as the reservation of the booth 16 described above.

For example, the processor 42 of the reservation management system 12 accepts reservations for rental of all or part of a business place (for example, a restaurant), in a case where the above specific conditions are satisfied. For example, the processor 42 displays information indicating that all or part of the business place can be reserved, on the reservation screen displayed on the terminal apparatus 26. For example, the processor 42 of the reservation management system 12 accepts reservations for business places during a time zone where the above specific conditions are satisfied.

In a case of executing a process of renting all or a part of a business place (for example, a restaurant), the processor 42 of the reservation management system 12 may notify the business operator conducting the business (for example, a person who runs a restaurant business) that the process of renting the business place is to be executed. For example, the processor 42 notifies the business operator that the process of renting the business place is executed, via a method such as e-mail. The contact information of the business operator (for example, the business operator name, e-mail address, telephone number, or the like) is registered in the reservation management system 12, and the processor 42 of the reservation management system 12 provides a notification to the contact information of the business operator.

Specific conditions are, for example, specific economic conditions. Specifically, the specific condition is a condition regarding the relationship between a first profit that is predicted to be obtained by conducting the business at the business place where the business is conducted and a second profit that is obtained by renting the business place as the place used for purposes other than the business.

The case where a specific condition is satisfied is, for example, a case where the second profit is larger than the first profit.

For example, information for predicting the first profit is transmitted from the terminal apparatus or the like of the business operator to the reservation management system. 12, and the processor 42 of the reservation management system 12 predicts the first profit based on the information. The information for predicting the first profit includes, for example, first history information indicating the first history of conducting a business at the business place, and the processor 42 predicts the first profit, based on the first history information. Examples of the first history information include information indicating business sales and expenses (for example, labor costs, rent, equipment costs, or the like) per time zone, day, week, and month. Examples of the information indicating the sales may include information such as the number of customers who have used the business place and the customer unit price. The processor 42 predicts, for example, future business sales and expenses per time zone, day, week, and month, based on the second history information, and predicts the second profit per time zone, day, week, and month. For example, the processor 42 calculates the first profit as a predicted value by subtracting the expenses from the predicted sales. In this way, the processor 42 predicts the first profit based on the past business performance. Ina case where the first history is not present, the processor 42 may predict the first profit based on the predicted values of sales and expenses provided by the business operator.

Further, information for predicting the second profit is transmitted from the terminal apparatus of the business operator, the personal payment system 20, the corporate payment system 24, or the like, to the reservation management system 12, and the processor 42 of the reservation management system 12 predicts the second profit based on the information. The information for predicting the second profit includes, for example, second history information indicating the second history of renting the business place, and the processor 42 predicts the second profit, based on the second history information. Examples of the second history information include information indicating rental sales and expenses (for example, labor costs, rent, equipment costs, or the like) per time zone, day, week, and month. The processor 42 predicts, for example, future rental sales and expenses per time zone, day, week, and month, based on the second history information, and predicts the second profit per time zone, day, week, and month. For example, the processor 42 calculates the second profit as a predicted value by subtracting the expense from the predicted sales. In this way, the processor 42 predicts the second profit, based on the past rental performance. In a case where the second history does not present, the processor 42 may use a predetermined profit as the second profit. The predetermined profit is determined based on, for example, the place conditions, the size of the business place, the state of the business place, the rental record of the equivalent business place, and the like.

The processor 42 of the reservation management system 12 may predict a first profit and a second profit, based on the cost required for switching between the business place and the place where the business place is rented for other purposes, the first history, and the second history. The cost is calculated based on the time and the labor cost required for the switching. For example, the cost of switching the environment of the business place to the environment of the place used for other purposes (for example, labor cost, equipment cost, or the like) (hereinafter referred to as "first cost") and the cost of returning the environment of the place used for other purposes to the environment of the business place (for example, labor cost, equipment cost, or the like) (hereinafter referred to as "second cost") can be incurred.

For example, the processor 42 may calculate the first profit by subtracting the first cost from the sales calculated from the first history, or may calculate the first profit by subtracting the first cost and the second cost from the sales calculated from the first history. Further, the processor 42 may calculate the second profit by subtracting the second cost from the sales calculated from the second history, or may calculate the second profit by subtracting the first cost and the second cost from the sales calculated from the second history.

The processor 42 determines whether or not a specific condition is satisfied, based on the first profit and the second profit calculated in consideration of the cost.

Further, in a case of using special equipment, the processor 42 may calculate the first profit and the second profit by including the running cost of the equipment in the above cost.

The processor 42 calculates the first profit and the second profit for each predetermined period (for example, every day, every week, or every month), and determines whether or not a specific condition is satisfied.

Further, in a case where it is not realistic to rent a business place as a place used for other purposes, the processor 42 may not execute the process of renting the business place as a place used for other purposes. For example, in a case where more people than the number expected in advance is required to switch the business place to a place used for other purposes, the processor 42 may not execute the rental process. To give a specific example, in a case where work such as changing the layout of a business place or arranging tools occurs, the number of people to perform the work is predetermined. For example, in a case where the number of people doing business at the business place is less than the predetermined number of people, the processor 42 does not execute the rental process, and in a case where the number of people doing business at the business place is equal to or more than the predetermined number of people, the processor 42 executes the rental process. In a case where the number of people who operate the place used for other purposes is less than the predetermined number of people, the processor 42 does not execute the rental process, and in a case where the number of people who operate the place is equal to or more than the predetermined number of people, the processor 42 may execute the rental process. Information indicating the contents of the above work and information indicating the number of people to perform the work are stored in, for example, the memory 40 of the reservation management system 12, and the processor 42 determines whether to execute the rental process, based on these pieces of information.

In a case where the number of seats is set in a place used for other purposes and seats of the number of seats are rented, the processor 42 may change the number of seats such that the second profit is increased when the business place is rented as a place used for other purposes. In a case where it is considered that the cost increases as the number of seats increases, the processor 42 adjusts the number of seats such that the second profit increases, based on the relationship between the cost and the second profit.

As described above, by renting a business place as a place used for other purposes, the business operator who has rented the business place can acquire the profit generated by the renting. For example, it is conceivable to rent a business place where the regular business is conducted as a place used for other purposes, for busy adjustment. Specifically, it is conceivable to rent the business place, at a time period or time zone where the profit of the regular business decreases. For example, by renting a business place for other purposes at a time zone or time period when the second profit is expected to be larger than the first profit, the business operator may be able to obtain a higher profit than in a case where a business is conducted. The information processing system according to the present exemplary embodiment can provide such a rental service.

In a case where an emergency is occurring at the business place, or an emergency is occurring within a predetermined range including the business place, the processor 42 may prohibit the acceptance of reservations for renting the business place as a place used for other purposes.

The processor 42 may display information indicating that an emergency has occurred in or around the business place, on the reservation screen of the business place.

For example, the processor 42 obtains information indicating that an emergency is occurring, from a government official gazette, from mass media (for example, a publisher, a newspaper company, a broadcasting station, or the like), via the Internet, or from the SNS.

The emergency may be, for example, a natural disaster or a man-made disaster. Specifically, outbreaks of viruses, traffic accidents, earthquakes, heavy rains, typhoons, fires, crimes, or the like corresponds to emergency.

Further, in a case where a factory or the like is installed near the business place and noise is generated, the processor may display information indicating that fact on the reservation screen of the business place. The processor 42 may display, on the reservation screen of the business place, information that warns users who want to use the place in a quiet environment not to reserve the business place.

Further, in a case where an emergency is occurring at the business place, or an emergency is occurring within a predetermined range including the business place, the processor 42 may prohibit the acceptance of reservations for the business place by a user other than the user having a specific attribute.

For example, the attributes of the user are included in the user's account and registered in the reservation management system 12. Examples of the attributes of the user include gender, age, or account type (for example, individual user or corporate user).

For example, for business places near places where suspicious persons appear or violent crimes such as robbery occur, the processor 42 accepts reservations only for adult men, and does not accept reservations from users other than adult men.

Further, the time zone for renting the business place may be determined according to the attributes of the user. For example, the processor 42 prohibits reservations for rental of business places at night, in a case where the user is a child (for example, in a case where the user's age is less than a predetermined age).

Further, in a case where the user is a corporate user and the working hours of the user exceed a predetermined time (for example, 12 hours), the processor 42 may prohibit the user from making a reservation for rental of a business place. For example, the processor 42 acquires the data on the schedule of the user, and calculates the total working hours inside and outside the company, and in a case where the total exceeds the predetermined working hours, the processor 42 prohibits a reservation for rental of the business place.

Hereinafter, a reservation screen for making a reservation for rental of a business place will be described with reference to FIGS. 23 and 24. FIGS. 23 and 24 illustrate an example of a reservation screen.

FIGS. 23 and 24 are reservation screens for making a reservation for rental of the place α, which is a business place. FIG. 23 illustrates a reservation screen for user A, and FIG. 24 illustrates a reservation screen for user B. The reservation screen for the user A is displayed on the display of the terminal apparatus 26 of the user A. The reservation screen for the user B is displayed on the display of the terminal apparatus 26 of the user B.

For example, in a case where the user A logs in to the reservation management system 12 by using the terminal apparatus 26, and designates the place α as the place to be reserved, the reservation screen of the place α is displayed on the display of the terminal apparatus 26 of the user A. Similarly, in a case where the user B logs in to the reservation management system 12 by using the terminal apparatus 26, and designates the place α as the place to be reserved, the reservation screen of the place α is displayed on the display of the terminal apparatus 26 of the user B.

On the reservation screen, as an example, information indicating the reservation time (for example, a list of reservation times) and information indicating whether or not the reservation is available are displayed. The symbol "○" indicates that a reservation is possible, and the symbol "x" indicates that a reservation is not possible.

The user can designate the time zone associated with the symbol "○" on the reservation screen and reserve the rental of the place α in that time zone.

Further, as described above, whether or not to make a reservation may be determined according to the attributes of the user. For example, the user A is a minor and the use of place α at night (for example, after 21:00) is prohibited. In this case, as illustrated in FIG. 23, the processor 42 prohibits the reservation of the rental of the place α at night. In the example illustrated in FIG. 23, the user A is prohibited from making a reservation for rental of the place α from 21:00 to 22:00.

Further, the information displayed on the reservation screen may be changed in real time depending on the user, the external environment, or the like.

For example, the reservation screen illustrated in FIG. 24 is a reservation screen displayed at a time after the time when the reservation screen illustrated in FIG. 23 is displayed. In a case where that it has been found that the construction schedule is between 10:00 and 11:00, at a time after the reservation screen illustrated in FIG. 23 is displayed, the processor 42 prohibits the reservation of the rental of the place α in the time zone. On the reservation screen illustrated in FIG. 23, the reservation for the time zone is possible, but on the reservation screen illustrated in FIG. 24, the reservation for the time zone is not possible.

Example 2

Hereinafter, Example 2 will be described.

In Example 2, the processor 42 of the reservation management system 12 executes a process of accepting an advance reservation of the rental of the place, in a case where a condition for starting a reservation is satisfied, before preparation for renting the place such as the booth 16 is completed. Here, the advance reservation of the booth 16 as an example of the place will be described.

As described with reference to FIGS. 14 to 16, the booth 16 is registered as a dummy in the operation management system 10, the booth 16 is ordered, the booth 16 is produced by the booth production company, and the booth 16 is installed at the installation place, which makes it possible to use the booth 16.

The reservation of the booth 16 may be started after the booth 16 is installed, but as an advance reservation, the booth 16 may be reserved in advance, in case where the conditions for starting the reservation are satisfied, before the booth 16 is installed.

The case where the condition for starting the reservation is satisfied is, for example, the case where the booth 16 is registered in the operation management system 10 which is a system for operating the rental of the booth 16. For example, in a case where the booth 16 is registered as a dummy in the operation management system. 10, the condition for starting the reservation may be satisfied.

For example, examples of the case where the conditions for starting a reservation are satisfied include a case where the booth 16 and the equipment in the booth 16 cannot be prepared, but a contract to install the booth 16 has been concluded and the booth 16 is registered as a dummy, a case where preparing for the installation of the booth 16 is started and the booth 16 is registered as a dummy, a case where the booth 16 is installed at the installation place, or the like.

Hereinafter, Example 2 will be described in more detail.

A normal reservation of the booth 16, for which the advance reservation is not made will be described with reference to FIGS. 25 to 28.

Figure 25:
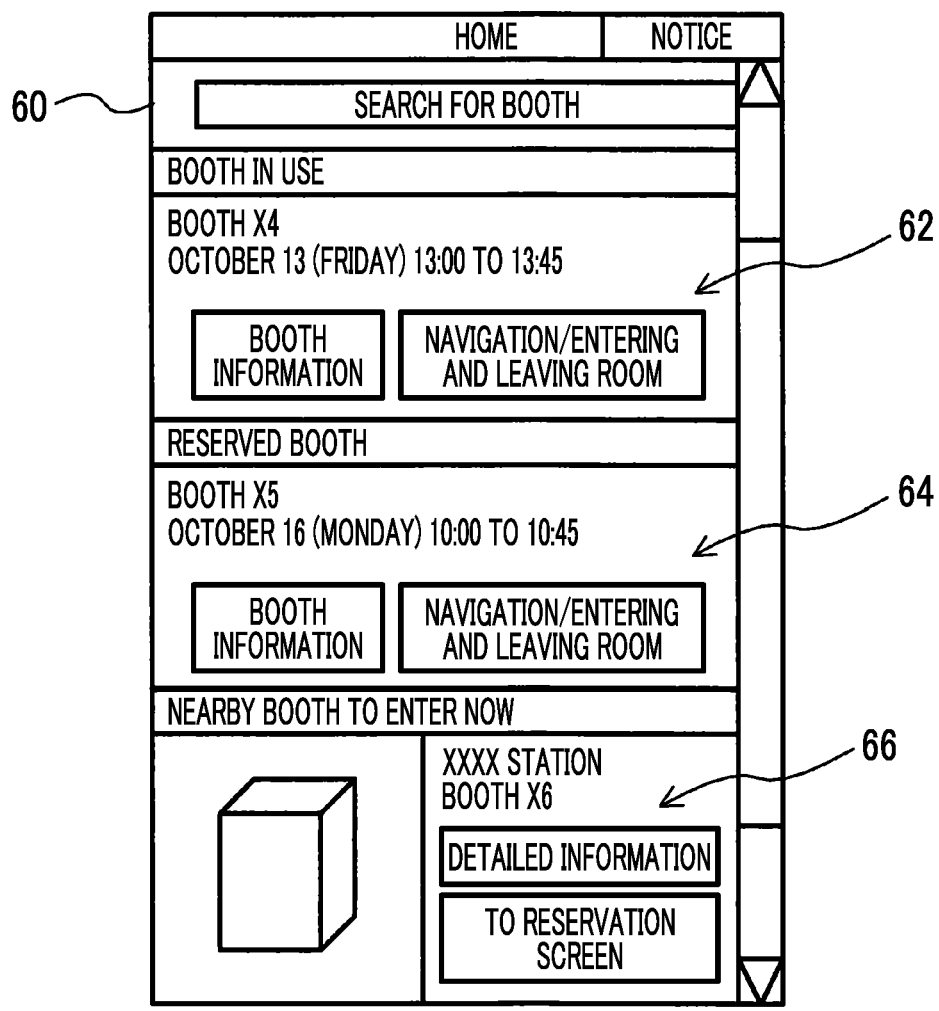
FIG. 25 is a diagram illustrating a home screen.

FIG. 25 illustrates an example of a home screen. In a case where the user logs in to the reservation management system 12 by using the terminal apparatus 26A, the processor 50 of the terminal apparatus 26 displays the home screen 60 on the display of the terminal apparatus 26A. For example, the processor 50 receives the information on the home screen 60 from the reservation management system 12 and displays the home screen 60 on the display. On the home screen 60, as an example, as indicated by reference numeral 62, information about the booth 16 being used by the user (for example, "booth X4"), information about the booth 16 reserved by the user (for example, "booth X5"), and the like are displayed on the home screen 60.

Examples of the information about the booth include information indicating the name of the booth, information indicating the place where the booth is installed, information indicating the date and time of reservation, and the like. The processor 50 of the terminal apparatus 26A receives these pieces of information from the reservation management system 12 and displays these pieces of information on the home screen 60. In addition, the information about the booth reserved by the user is registered in the reservation management table.

Further, as indicated by reference numeral 66, information about another booth 16 (for example, "booth X6") is displayed on the home screen 60. For example, the processor 50 of the terminal apparatus 26A receives information about booths 16 that are installed at a place where the distance from the position of the user is equal to or less than a threshold value and that can be used at the present time (for example, "booth X6") from the reservation management system 12, and displays a list of the booths 16 on the home screen 60. The position of the user is the position of the terminal apparatus 26A used by the user. The booths 16 that can be used at the present time (for example, "booth X6") are booths 16 that are not reserved and can be reserved at the present time. For example, the booths 16 that can be used at the present time are booths 16 that are not reserved within a predetermined period from the present time, that is, booths 16 that can be reserved as long as it is within a predetermined period from the present time. For example, in a case where the current time is 9:30, information about booths 16 that are not reserved between 9:00 and 11:00 are displayed as information about booths 16 that can be used at the present time. Further, the images of the booths 16 may be displayed.

In a case where the "detailed information" button for the booth X6 is displayed on the home screen 60 and the "detailed information" button is pressed by the user, the processor 50 of the terminal apparatus 26A receives the detailed information on the booth X6 from the reservation management system 12, and displays the detailed information on the display of the terminal apparatus 26A. For example, another screen different from the home screen 60 is displayed on the display, and detailed information is displayed on the other screen. Examples of the detailed information include information indicating the address of the place where the booth X6 is installed, information indicating the place where the booth X6 is installed (for example, in a case where the booth X6 is installed at the station, information indicating the name of the station), a map in which the position of booth X6 is illustrated, information about the equipment installed in the booth X6, and the like.

Further, in a case where the "to reservation screen" button for the booth X6 is displayed on the home screen 60 and the "to reservation screen" button is pressed by the user, the processor 50 of the terminal apparatus 26A displays a reservation screen, which is a screen for reserving the booth X6 on the display of the terminal apparatus 26A. For example, a reservation screen different from the home screen 60 is displayed on the display. In a case where the user instructs the reservation by designating the date and time on the reservation screen, the information indicating the instruction is transmitted from the terminal apparatus 26A to the reservation management system 12, and the reservation is completed by the reservation management system 12. The reservation is registered in the reservation management table stored in the reservation management system 12. The user can use the reserved booth X6 at the reserved date and time.

Further, a button for searching for the booth 16 (for example, a "search for booth" button) is displayed on the home screen 60, and in a case where the button is pressed by the user, the processor 50 of the terminal apparatus 26A displays search screen for searching for the booth 16 on the display of the terminal apparatus 26A.

FIG. 26 illustrates an example of the search screen. In a case where the date and time when the booth 16 is to be used and the installation place of the booth 16 are designated on the search screen 68, the booth 16 is searched using the date and time and the installation place as search keys. For example, the booth 16 can be searched using the user's current position or the nearest station as a search key.

FIG. 27 illustrates an example of the search result screen of the booth 16. As an example, the screen 70 illustrates the reservation status of the three booths 16 installed at the AAA station. The symbol "○" indicates that a reservation is possible, and the symbol "x" indicates that a reservation is not possible. In a case where the user designates the booth 16 and the usage time on the screen 70 and presses the reservation confirmation button, the reservation management system 12 completes the reservation for the use of the booth 16 at the usage time.

FIG. 28 illustrates an example of the reservation completion screen. The reservation completion screen 72 is a screen indicating that the normal reservation has been completed. For example, information indicating the place where the booth 16 is installed (for example, the station name), information for identifying the booth 16, information indicating the reservation date and time, information indicating how to use the booth 16, and the like are displayed on the reservation completion screen 72.

Hereinafter, a screen in a case where advance reservation is made will be described.

For example, information indicating that the booth 16 is a place subject to advance reservation is displayed on the screen for reserving the booth 16. Hereinafter, a specific example will be described.

Figure 29:
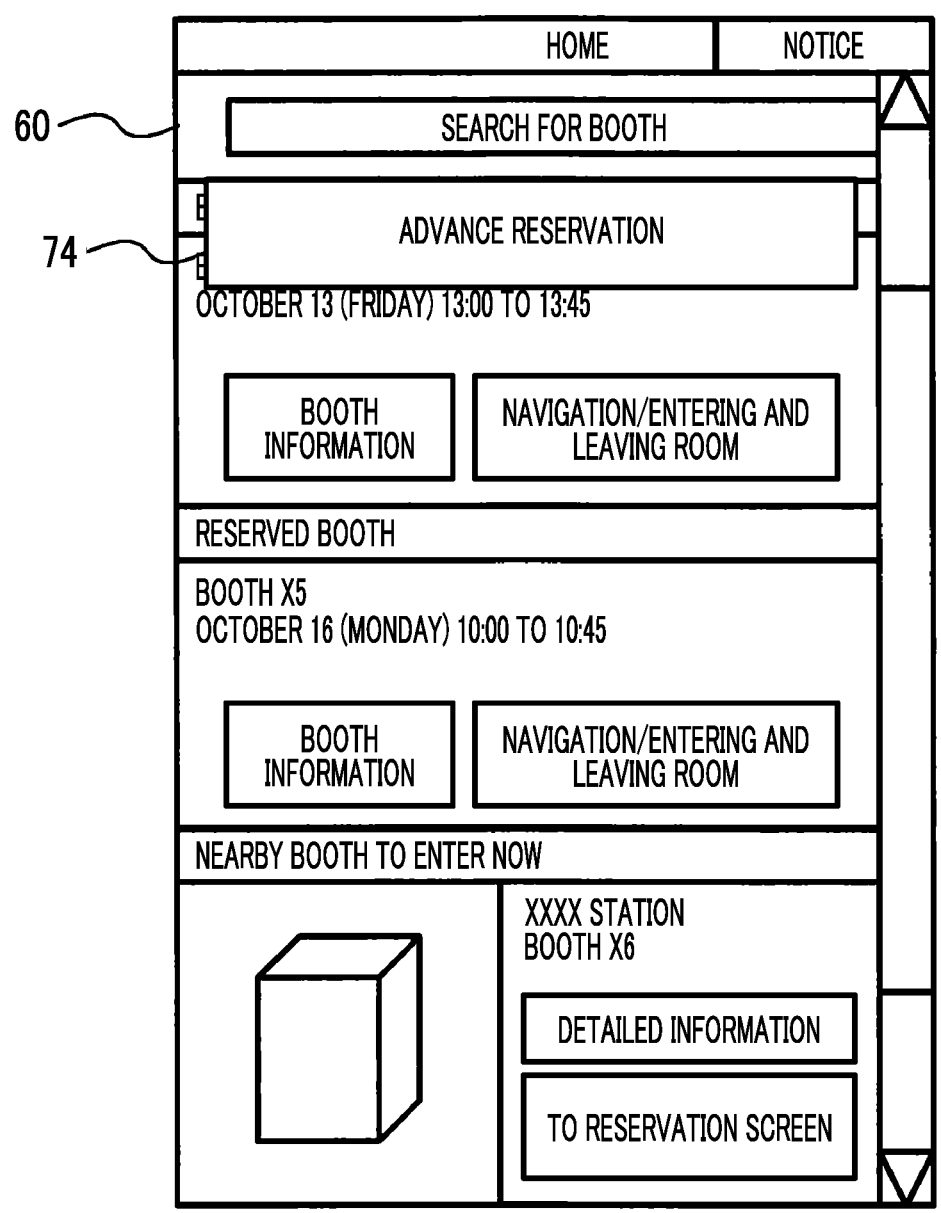
FIG. 29 is a diagram illustrating a home screen.

FIG. 29 illustrates an example of the home screen 60 in a case where advance reservation is made. For example, the processor 50 of the terminal apparatus 26A receives information about the booth 16 subject to advance reservation from the reservation management system 12, and a message 74 indicating that the booth 16 subject to advance reservation is displayed on the home screen 60.

Figure 30:
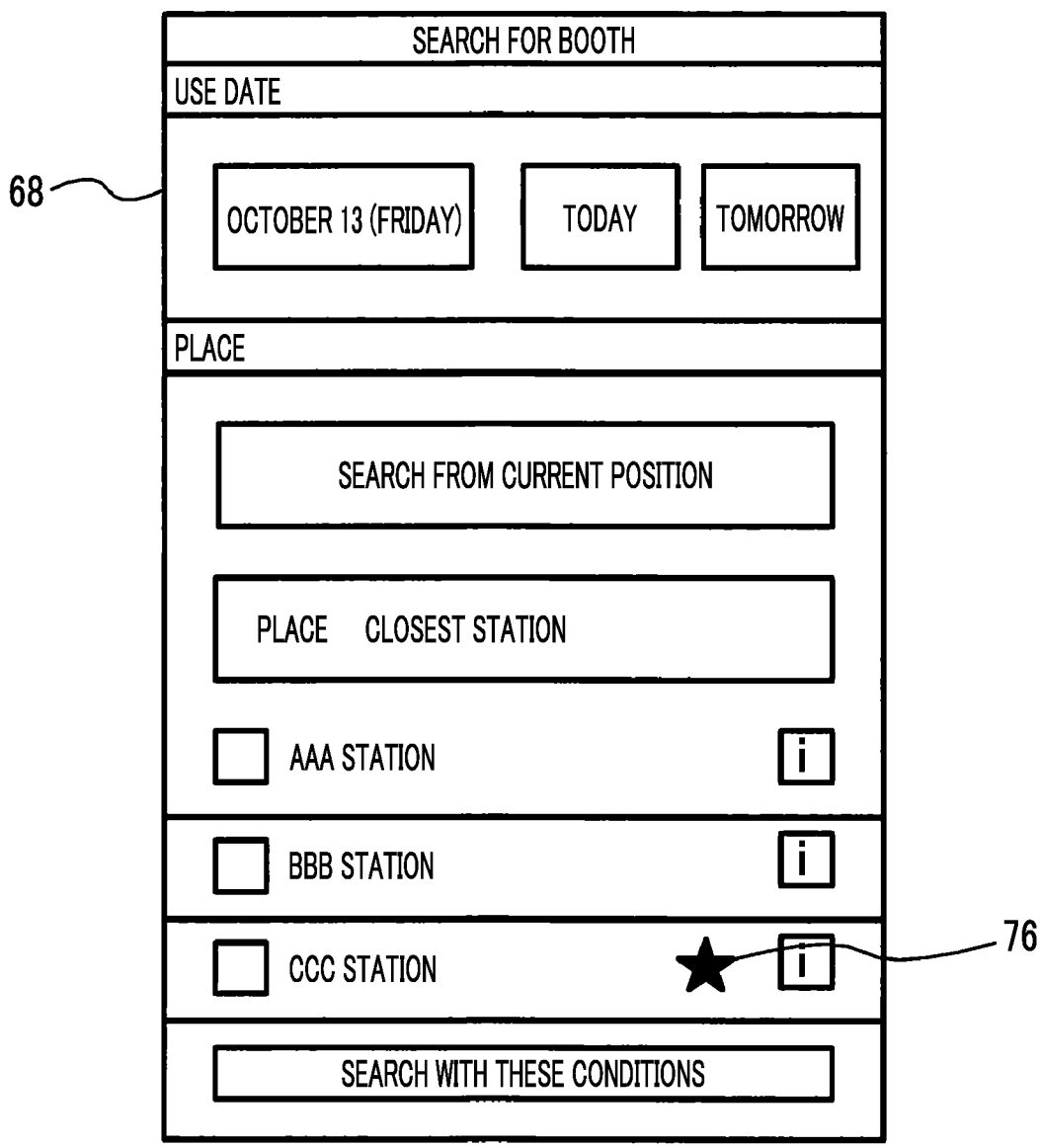
FIG. 30 is a diagram illustrating a search screen.

FIG. 30 illustrates an example of the search screen 68. For example, the booth 16 installed at the CCC station is a booth 16 that is subject to advance reservation. In this case, the processor 50 of the terminal apparatus 26A receives information about the booth 16 subject to advance reservation (for example, information indicating that the booth 16 installed at the CCC station is subject to advance reservation) from the reservation management system 12, and on the search screen 68, in a CCC station field, an image 76 indicating that the booth 16 installed at the CCC station is subject to advance reservation is displayed. Further, in a case where the user designates the CCC station field on the search screen 68, information indicating the start date and time of use of the booth 16 installed at the CCC station may be displayed on the search screen 68. The image 76 is not displayed for the booth 16 which is not subject to advance reservation.

Figure 31:
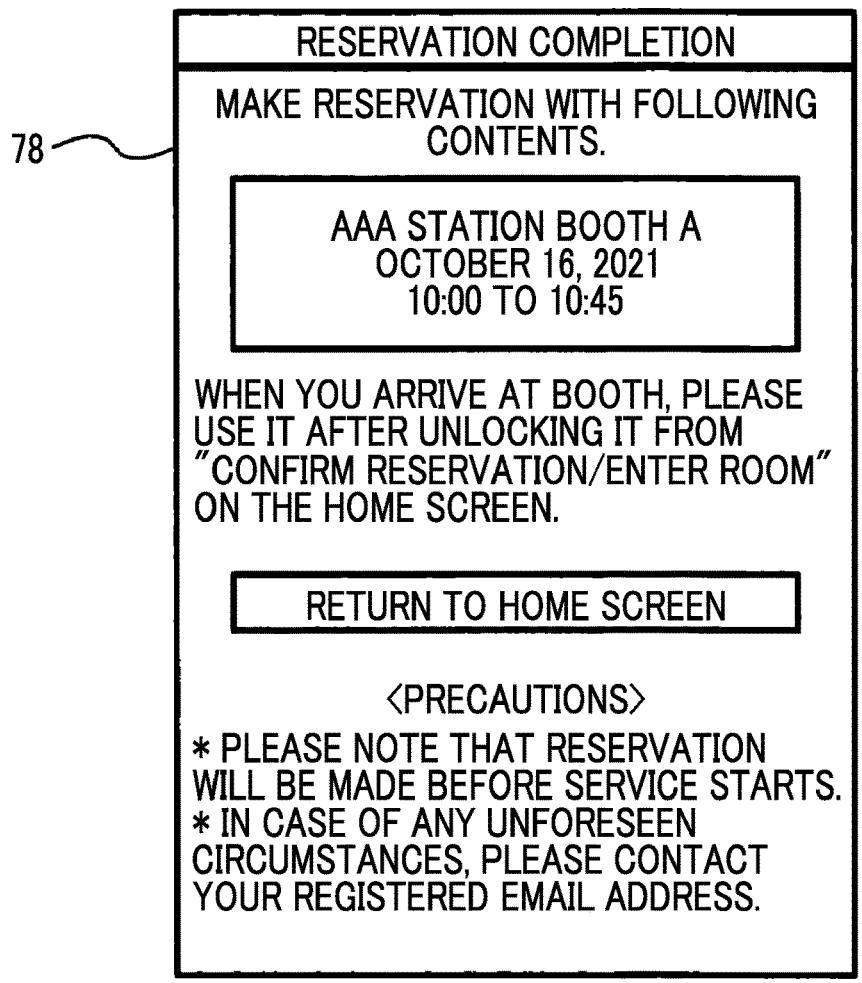
FIG. 31 is a diagram illustrating a reservation completion screen.

FIG. 31 illustrates an example of a reservation completion screen in a case where an advance reservation is made. Notice is displayed on the reservation completion screen 78. For example, a message indicating that it is before the start of the rental service of the booth 16 or that an unexpected situation may occur is displayed on the reservation completion screen 78.

The reservation screen for making an advance reservation and the reservation screen for making a normal reservation other than the advance reservation may be displayed separately. For example, in a case where the user instructs to display a reservation screen for making an advance reservation, the reservation screen for making an advance reservation is displayed, and in a case where the user instructs to display a reservation screen for making a normal reservation, the reservation screen for making a normal reservation is displayed.

The processor 42 of the reservation management system 12 may restrict advance reservations more than reservations for places that are prepared to be rented (for example, booths 16 or business places). For example, the processor 42 may make the number of booths 16 for which advance reservation is available smaller than the number of booths 16 for which advance reservation is not available and normal reservation is available, make a period for which advance reservation is available shorter than a period for which normal reservation is available, make a fee for advance reservation higher than a fee for normal reservation, or charge the user a fee for advance reservation (for example, a deposit) (a fee that is not charged in the normal reservation).

Examples 1 and 2 may be combined. That is, the processor 42 may execute the process of renting all or a part of the business place by advance reservation. To give a specific example, in a case where all or part of a restaurant, which is an example of a business place, is rented as a place used for purposes other than the restaurant business, at the stage where all or part of the business place is registered in the operation management system. 10 as a dummy, advance reservation of all or part of the business place may be possible. Of course, advance reservation may be possible at a time before or after dummy registration.

Example 3

Hereinafter, Example 3 will be described.

In Example 3, depending on the relationship between the place (for example, booth 16 or business place) where the user makes a reservation for rental and the expiration date of the method for postpaid payment, which is owned by the user to pay for rental of the place, the reservation for renting the place may be restricted.

The postpaid payment is, for example, a payment using a credit card, a bank transfer, or a payment using a code (for example, a two-dimensional code). Of course, methods other than these may be used. In the following, as an example, the postpaid payment is assumed to be a payment using a credit card.

Figure 32:
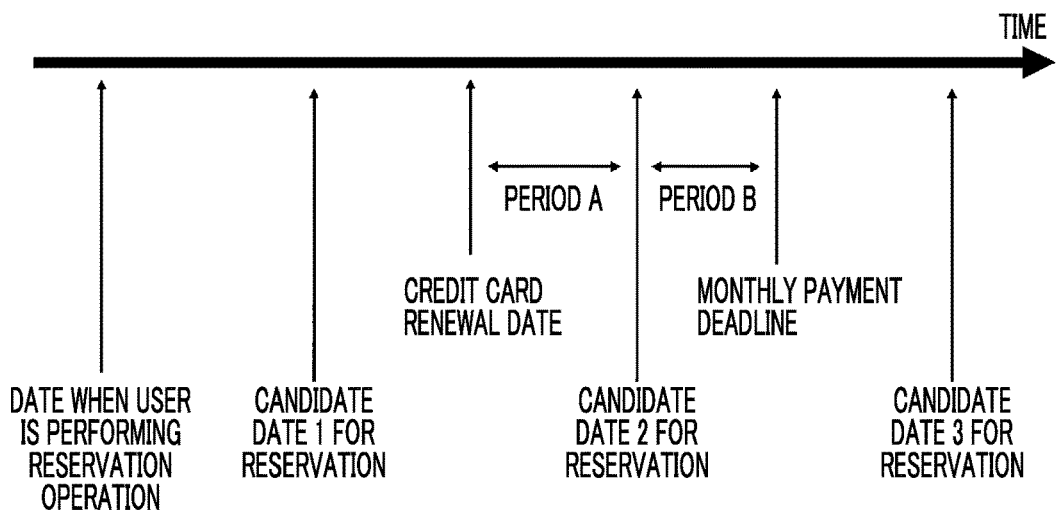

Example 3 will be described in detail with reference to FIG. 32. FIG. 32 illustrates a candidate date for reservation, and the like. The horizontal axis in FIG. 32 indicates time.

In FIG. 32, a date when the user is making a reservation operation by using the terminal apparatus 26, a credit card renewal date, a monthly payment deadline, and candidate dates for reservation of the place (for example, candidate dates 1, 2, and 3 for reservation) are illustrated. Here, as an example, a reservation operation date, a candidate date 1 for reservation, a credit card renewal date, a candidate date 2 for reservation, a payment deadline, and a candidate date 3 for reservation are arranged in chronological order in that order. The candidate date 1 for reservation is a date before the credit card renewal date. The candidate date 2 for reservation is a date between the credit card renewal date and the payment deadline. The candidate date 3 for reservation is a day after the payment deadline.

For example, the processor 42 of the reservation management system 12 may restrict the reservation of the day after the credit card renewal date. In the example illustrated in FIG. 32, the processor 42 may prohibit the reservation on the candidate dates 2 and 3 for reservation, in the date of the reservation operation. Since the candidate dates 2 and 3 for reservation are later than the credit card renewal date, payment for the use of the place may not be made unless the credit card is renewed. In order to prevent this, the processor 42 may prohibit the reservation of the candidate dates 2 and 3 for reservation.

Further, the processor 42 may display information indicating that reservations for days after the credit card renewal date are restricted, on the reservation screen displayed on the display of the terminal apparatus 26.

As another example, the processor 42 may display the information indicating the warning, on the reservation screen displayed on the display of the terminal apparatus 26, without prohibiting the reservation of the candidate dates 2 and 3 for reservation. For example, a message prompting the user to renew the credit card is displayed on the reservation screen.

In a case where the user reserves a date after the credit card renewal date, the processor 42 may guide the user to a payment method other than the credit card. Payment methods other than credit cards include, for example, cash payment, IC card payment, bank transfer, and the like. For example, cash payment, IC card payment, or the like, by which payment can be made at the reserved place, are guided to the user as a payment method other than a credit card. For example, information indicating a payment method other than a credit card may be displayed on the reservation screen displayed on the display of the user's terminal apparatus 26, may be displayed after the reservation is completed, or when the user uses the reserved place, the information may be displayed on the display installed at the place.

In a case where the reservation on the candidate date 2 for reservation is permitted, in a case where the credit card renewal can be checked during the period before the candidate date 2 for reservation (for example, a period A in FIG. 32), the processor 42 may maintain the reservation, and in a case where the renewal cannot be checked, the processor 42 may cancel the reservation. Information indicating the maintenance or cancellation of the reservation may be transmitted to and displayed on the terminal apparatus 26 of the reserved user.

As another example, the processor 42 may change the period of waiting for a credit card renewal, depending on the credibility of the user who reserves the place. For example, in a case where the credibility of the user who reserves the place is high (for example, in a case where the credibility of the user is equal to or higher than the threshold value), in a case where the credit card renewal can be checked during the period B until the payment deadline, the processor 42 may maintain the reservation, and in a case where the renewal cannot be checked, the processor 42 may cancel the reservation.

Examples of highly credible users include corporate users, users who have never neglected to pay in the past, users who have not renewed own credit cards for the first time during the period A, users with guarantors, or the like. In a case where there is a guarantor, payment from the guarantor may be requested.

Even in a case where credit card renewal cannot be checked during period B, the processor 42 may maintain the reservation, and send guidance of payment methods other than credit cards (for example, bank transfer, or the like) to the user. For example, the guidance is sent to the user's terminal apparatus 26 via e-mail or the like.

Example 1 or Example 2 and Example 3 may be combined. Further, Examples 1, 2, and 3 may be combined. For example, in a case where all or part of the business place is rented as a place used for other purposes, depending on the relationship between all or part of the business place that is the subject of a reservation for rental and the expiration date of the postpaid payment method used to pay for the rental of the business place, the reservation for rental of the business place may be restricted. In addition, advance reservations may be restricted.

Example 4

Hereinafter, Example 4 will be described.

In a case where a plurality of seats are installed at the place to be reserved and the seats are reserved, the processor 42 of the reservation management system 12 displays information indicating the distance between the seats on the reservation screen displayed on the display of the user's terminal apparatus 26.

Further, the user may reserve a seat by designating the distance between the seats. In a case where the processor 42 accepts the information indicating the distance, the processor 42 transmits the information indicating the distance, to the terminal apparatus 26 of the operator (for example, the business operator of the business place) of the place to be reserved. The operator sets the layout of the seats according to the distance.

In a case where the seats have a device that can move automatically (for example, a self-propelled mechanism, a robot, or the like), the processor 42 may transmit control information on the position to the device such that the distance between the seats is kept at a distance designated by the user, and control the distance between seats.

The processor 42 may display information indicating a place (for example, a booth 16 or a business place) having a layout (for example, a distance between seats) designated by the user, on the display of the terminal apparatus 26 of the user.

Hereinafter, Example 4 will be described in more detail.

Figure 33:
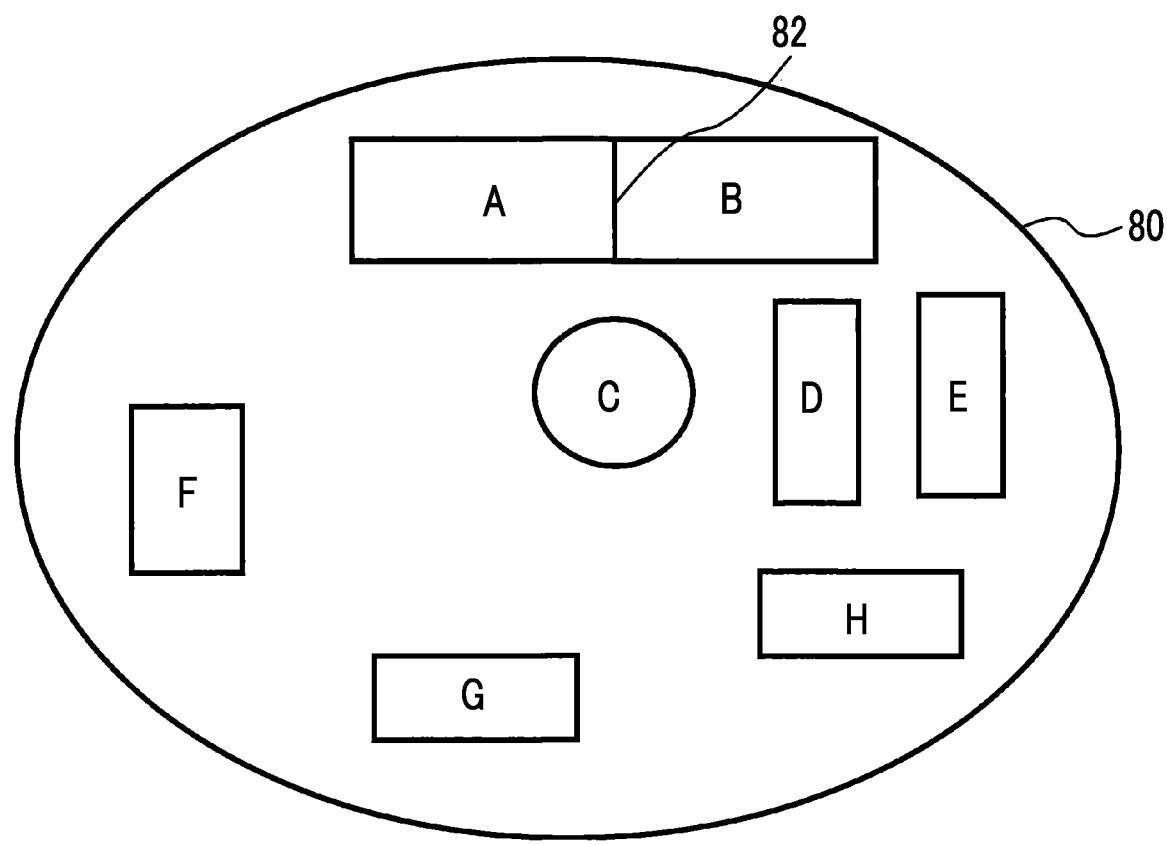
FIG. 33 is a diagram schematically illustrating a room.

FIG. 33 schematically illustrates a room 80, which is an example of a place to be reserved. Seats A to H are arranged in the room 80. Seats A to H are subject to reservation. Further, a partition plate 82 is installed between the seat A and the seat B.

Figure 34:
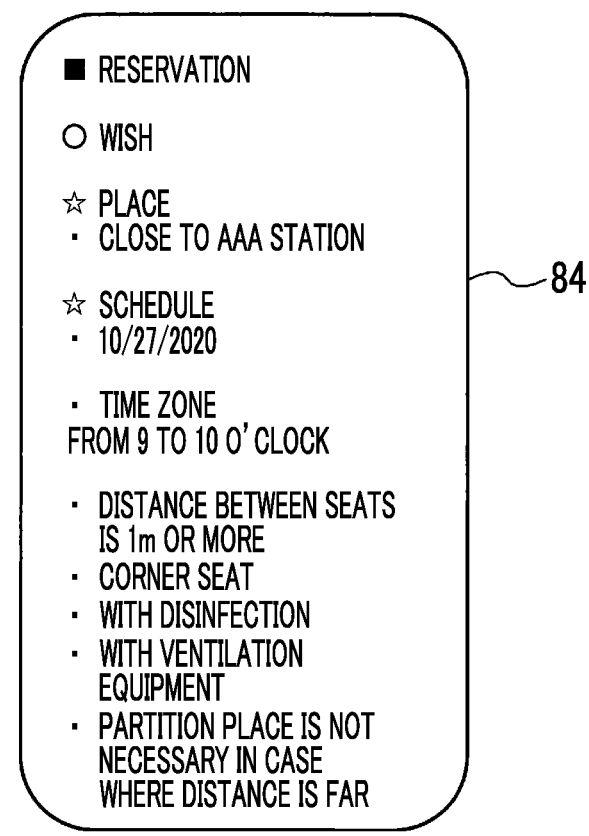
FIG. 34 is a diagram illustrating a reservation screen.

FIG. 34 illustrates a reservation screen 84 displayed on the display of the terminal apparatus 26. The reservation screen 84 is a screen for reserving a seat installed in the room 80. On the reservation screen 84, the user can reserve a seat by designating, for example, a place, a time (schedule or time zone), a distance between seats, a type of seat, the presence or absence of disinfection, the presence or absence of ventilation equipment, the presence or absence of a partition plate 82, and the like. For example, the seats F and G are seats that meet the conditions set on the reservation screen 84. In this case, the processor 42 displays information indicating the seats F and G on the display of the terminal apparatus 26.

In a case where it is possible to change the layout of the seats, the layout of the seats installed in the room 80 may be changed according to the request of the user who makes a reservation. For example, the layout of the seats is changed by the operator of the room 80. For example, information indicating the layout of the seats installed in the room 80 is stored in the memory 40 of the reservation management system 12, in a case where there is a difference between a layout that satisfies the user's request and a layout that is stored in the memory 40, the processor 42 transmits the information instructing the layout change to the terminal apparatus 26 of the operator of the room 80. The operator changes the layout of the seats according to the instructions.

Figure 35:
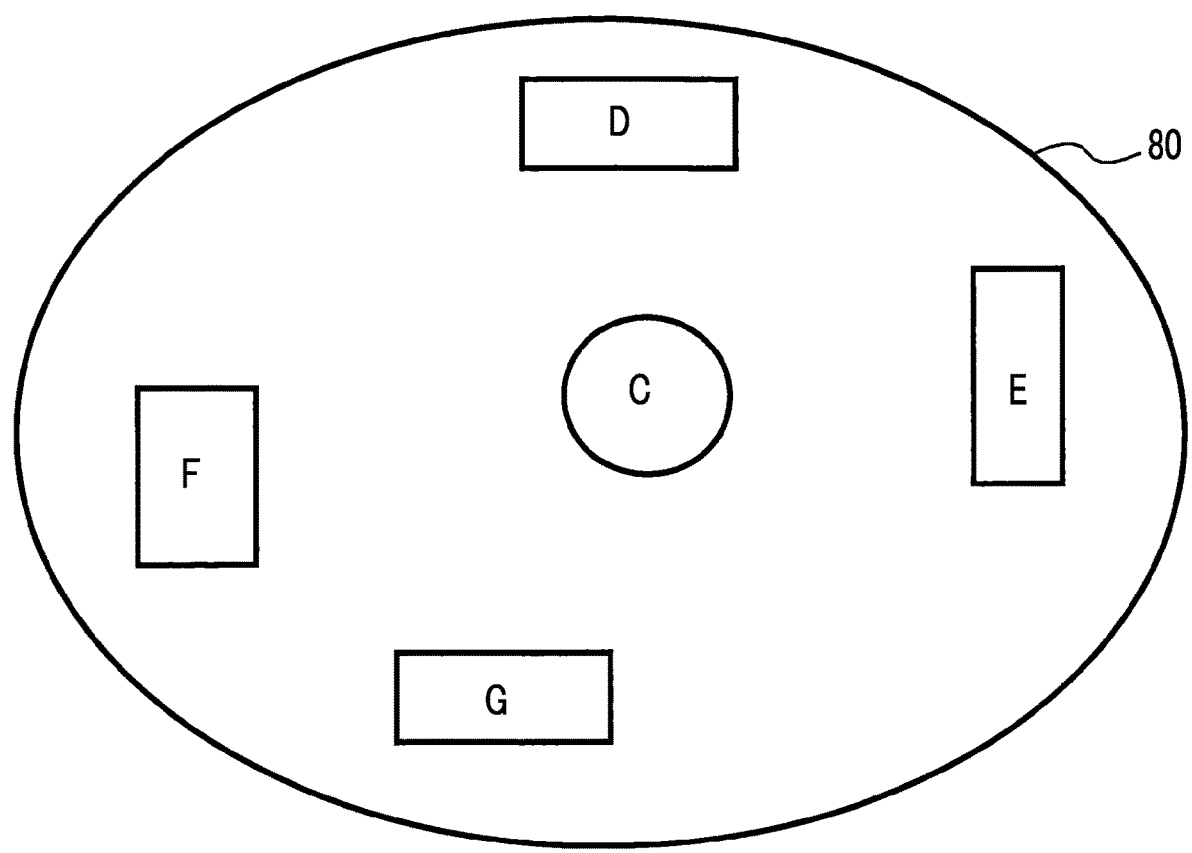
FIG. 35 is a diagram schematically illustrating a room.
Figure 36:
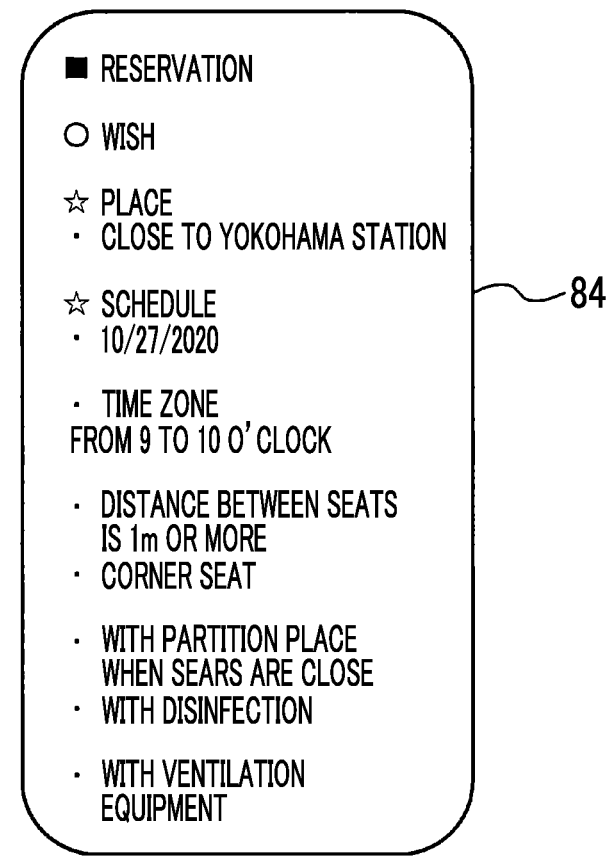
FIG. 36 is a diagram illustrating a reservation screen.

FIG. 35 illustrates the room 80 after the seat has been changed. Further, FIG. 36 illustrates a reservation screen 84 when the layout of the seats is requested. As illustrated in FIG. 35, the seats A and B have been removed, and the seats C to G are arranged such that the distance between the seats is 1 m or more. Further, since the distance between the seats is not close (for example, the distance between the seats is 1 m or more), no partition plate is installed.

In a case where a plurality of users occupy a specific place in the room 80 (for example, in a case where a group reservation is made), the processor 42 may accept a request for a layout change at the time of reservation.

In a case where the layout is changed, the information indicating the changed layout is stored in the memory 40 of the reservation management system 12. The processor 42 accepts a reservation for each seat in the room 80, according to the changed layout. For example, as illustrated in FIG. 35, the seats A and B are not installed in the room 80, after the layout is changed. In this case, the processor 42 does not accept reservations for seats A and B, but accepts reservations for seats C to G.

Further, the processor 42 may not accept reservations for time zones before and after the time when the layout is changed.

According to Example 4, the place can be used at a distance from a person. For example, it is possible to avoid noise such as voice or reduce the risk of infection such as virus.

Example 5

Hereinafter, Example 5 will be described.

In Example 5, the processor 42 of the reservation management system 12 may measure the quantity of people in the place, predicts the profit obtained in a case where the place is rented to the person, and determine whether or not to rent the place to a person, based on the predicted profit. The greater the quantity of people, the higher profit is predicted. For example, in a case where the predicted profit is equal to or higher than a predetermined threshold value, the processor 42 informs the operator who operates the place (for example, the business operator of the business place) that the place is to be rented. For example, the processor 42 transmits information indicating the guidance to the terminal apparatus 26 of the operator, via e-mail, SNS, or the like. A known technique is used as a technique for measuring the quantity of people.

The processor 42 may predict profits based on the time when a person has stayed at a place. For example, in a case where a person's staying time is less than a predetermined threshold, the processor 42 may exclude that person from the number of people to predict profits. Further, the processor 42 may predict the profit by performing a weighting process, according to the staying time.

The processor 42 may also predict profits based on the attributes of the person at the place. The attributes are, for example, age, gender, occupation, and the like. The attributes of a person may be specified, for example, based on an image taken by a camera provided at the place. For example, since adults are considered to be more payable than minors, the processor 42 weights adults heavier than minors and predicts profits.

The processor 42 may update profits, based on a historical history of the quantity of people at a place (for example, a history of the quantity of people per time zone, day of the week, week, month, or season).

In a case where a service of renting a place is started, the processor 42 of the reservation management system. 12 starts accepting the reservation of the place.

Ina case where the service for renting a place is already provided and the number of people using the place decreases, the processor 42 may notify the operator of the place that the rental service is to be terminated. For example, information indicating that the rental service is to be terminated is transmitted to the terminal apparatus 26 of the operator of the place, via e-mail, SNS, or the like. Further, the processor 42 may stop accepting reservations for the place in conjunction with the guidance.

In addition, the rental fee of the place to be reserved may fluctuate depending on the implementation of a specific public relations campaign, the use of coupons, and the like. In that case, the processor 42 may change the display of guidance on the screen of the terminal apparatus of the user who intends to make a reservation and the work until the reservation is completed.

For example, in a case where a period during which the user can make a reservation is from Jan. 5, 2021 to Feb. 5, 2021, and during that period, a period during which discount is made by the campaign is from Jan. 15, 2021 to Jan. 25, 2021, the processor 42 displays a guidance screen indicating that the price of reservations within the period of this campaign becomes lower than the price of reservations within the normal period (that is, the period outside the campaign period), on the user's terminal apparatus.

Further, in a case where there are a plurality of fee structures applied to the period during which the user can make a reservation, the processor 42 may change the step until the reservation is completed. For example, the processor 42 may display a guidance for calling attention to the user on the user's terminal apparatus, or may display a consent screen including a check box on the terminal apparatus, and complete the reservation, in a case where the user agrees to the fee structure and the check box is checked by the user. For example, in a case where the user reserves a day to which a plurality of fee structures are applied, the processor 42 may display information indicating the caution in an easy-to-see position (for example, the center of the guidance screen) on the guidance screen, or may not complete the reservation unless the check box for consent is checked. Of course, the display of the consent screen may be omitted depending on the individual setting of the user.

Further, in a case where the fee is paid by the company's expenses, or the like (for example, in a case where the fee needs to be settled with a clear fee structure), in a case where the fee changes due to the campaign, a receipt may be issued to show the change, or a service that allows a receipt image to be checked may be provided on the Internet.

In a case where the campaign is executed after the reservation is completed, the processor 42 may notify the user's contact information that the campaign is to be executed, and apply the campaign afterwards. In this case, in a case where the user checks the status of his/her own reservation, guidance is provided according to the steps at the time of the campaign. Further, even in a case where the reservation time is extended and a period with different fee structures is reserved, guidance may be provided in the same manner as described above.

In the embodiments above, the term "processor" refers to hardware in abroad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
   display a search screen on a terminal apparatus of a user to initiate a process of renting a place where a business is conducted as a place used for purposes other than the business;
   receive a selected reservation date and a selected reservation location selected by the user on the search screen from the terminal apparatus;
   display a search result on the terminal apparatus according to the selected reservation date and the selected reservation location, wherein the search result comprises at least one available time zone for at least one available place in the selected reservation location on the selected reservation date;
   receive and determine whether a selected available time zone for a selected available place selected by the user as a reservation for rental of the place satisfies a specific condition;

accept an advance reservation for the rental of the place, in a case where a condition for starting a reservation is satisfied, before preparation for renting the place is completed and restrict the advance reservation more than reservations for places for which preparation for renting is completed;

accept the reservation for rental of the place in a case where the specific condition is satisfied;

in response to an acceptance for the rental of the place, transmit usage information for authentication to the terminal apparatus; and in response to the usage information for authentication being received from the terminal apparatus, transmit a control signal to unlock the selected available place as the reservation for rental during the selected available time zone for the user.

2. The information processing apparatus according to claim 1, wherein
the processor is further configured to notify a business operator conducting the business that the process of renting the place is to be executed, in a case of initiating the process of renting the place.

3. The information processing apparatus according to claim 1, wherein
the specific condition is a condition relating to a relationship between a first profit predicted to be obtained by conducting the business at the place and a second profit obtained by renting the place.

4. The information processing apparatus according to claim 3, wherein
the case where the specific condition is satisfied is a case where the second profit is larger than the first profit.

5. The information processing apparatus according to claim 3, wherein
the processor is configured to
predict the first profit based on a first history of the business at the place, and
predict the second profit based on second history of renting the place.

6. The information processing apparatus according to claim 5, wherein
the processor is further configured to predict the first profit and the second profit, based on information including a cost required for switching between the place where the business is conducted and the place to be rented, the first history, and the second history.

7. The information processing apparatus according to claim 1, wherein
the processor is further configured to prohibit acceptance of reservations for rental of the place, in a case where an emergency occurs at the place.

8. The information processing apparatus according to claim 7, wherein
the processor is further configured to prohibit acceptance of reservations by users other than users having specific attributes, in a case where an emergency occurs at the place.

9. The information processing apparatus according to claim 1, wherein
the case where the condition for starting the reservation is satisfied is a case where the place is registered in a system for operating the rental of the place.

10. The information processing apparatus according to claim 1, wherein
the processor is further configured to display that the place is a target place of the advance reservation, on a screen for reserving the place.

11. The information processing apparatus according to claim 1, wherein
the processor is further configured to restrict the reservation for rental of the place, depending on a relationship between the place where the user makes a reservation for rental and an expiration date of means for postpaid payment, which is owned by the user to pay for rental of the place.

12. The information processing apparatus according to claim 11, wherein
the processor is configured to restrict reservations for days after a renewal date of the means for postpaid payment.

13. The information processing apparatus according to claim 12, wherein
the processor is further configured to inform the user of a payment method other than the means for postpaid payment, in a case where reservations for days after the renewal date of the means for postpaid payment are made.

14. The information processing apparatus according to claim 11, wherein
the processor is further configured to display information indicating that reservations are restricted on a screen for reserving the place.

15. The information processing apparatus according to claim 1, wherein
the processor is further configured to, in a case where a rental fee for the place, which is a candidate for reservation, changes depending on a reservation date due to a specific campaign, change a guidance screen and a step of completing reservation reception until the reservation process is completed are changed, between reception dates when a reservation is available outside a period of the campaign and reception dates for a reservation within the period of the campaign.

16. A non-transitory computer readable medium storing a program causing a computer to execute a process, the process comprising:
display a search screen on a terminal apparatus of a user to initiate process of renting a place where a business is conducted as a place used for purposes other than the business;
receive a selected reservation date and a selected reservation location selected by the user on the search screen from the terminal apparatus;
display a search result on the terminal apparatus according to the selected reservation date and the selected reservation location, wherein the search result comprises at least one available time zone for at least one available place in the selected reservation location on the selected reservation date;
receive and determine whether a selected available time zone for a selected available place selected by the user as a reservation for rental of the place satisfies a specific condition;
accept an advance reservation for the rental of the place, in a case where a condition for starting a reservation is satisfied, before preparation for renting the place is completed and restrict the advance reservation more than reservations for places for which preparation for renting is completed;
accept the reservation for rental of the place in a case where the specific condition is satisfied;
in response to an acceptance for the rental of the place, transmit usage information for authentication to the terminal apparatus; and in response to the usage information for authentication being received from the terminal apparatus, transmit a control signal to unlock the selected available place as the reservation for rental during the selected available time zone for the user.

\* \* \* \* \*